United States Patent [19]

Asay et al.

[11] Patent Number: 5,903,882
[45] Date of Patent: May 11, 1999

[54] RELIANCE SERVER FOR ELECTRONIC TRANSACTION SYSTEM

[75] Inventors: Alan Asay, Salt Lake City; Paul A. Turner, Sandy, both of Utah; Frank W. Sudia, Newton Centre, Mass.; Richard Ankney, Chantilly, Va.

[73] Assignee: Certco, LLC, New York, N.Y.

[21] Appl. No.: 08/767,257

[22] Filed: Dec. 13, 1996

[51] Int. Cl.⁶ .................................................. H04L 9/32
[52] U.S. Cl. .................................. 705/44; 707/9; 380/23; 380/25; 380/30
[58] Field of Search .............................. 705/44; 380/30, 380/23, 25; 235/379, 380; 707/9

[56] References Cited

U.S. PATENT DOCUMENTS 5,453,601  9/1995  Rosen ...................................... 235/379
5,455,507  10/1995 Rosen ...................................... 235/380

FOREIGN PATENT DOCUMENTS 95 23465  8/1995  WIPO .
96 21192  7/1996  WIPO .
96 31965  10/1996 WIPO .
96 32701  10/1996 WIPO .

OTHER PUBLICATIONS

Bellare M et al, "IKP—A Family of Secure Electronic Payment Protocols", Proceedings of the Usenix Workshop of Electronic Commerce, Jul. 11, 1995, pp. 89–106.

International Search Report dated Jul. 6, 1998.

Paul Kocher, A Quick Introduction to Certificate Revocation Trees (CRTs), A Quick Introduction to CRTs, 3 pgs. No Date.

*Primary Examiner*—James P. Trammell
*Assistant Examiner*—Matthew Smithers
*Attorney, Agent, or Firm*—Pillsbury Madison & Sutro LLP

[57] ABSTRACT

A method of managing reliance in an electronic transaction system includes a certification authority issuing a primary certificate to a subscriber and forwarding to a reliance server, information about the issued primary certificate. The reliance server maintains the forwarded information about issued primary certificate. The subscriber forms a transaction and then provides the transaction to a relying party. The transaction includes the primary certificate or a reference thereto. The relying party sends to the reliance server a request for assurance based on the transaction received from the subscriber. The reliance server determines whether to provide the requested assurance based on the information about the issued primary certificate and on the requested assurance. Based on the determining, the reliance server issues to the relying party a secondary certificate providing the assurance to the relying party.

56 Claims, 12 Drawing Sheets

Fig. 1
*Prior Art*

| X.509 Certificate |
|---|
| Version Number |
| Certificate Serial Number |
| Algorithm Identifier |
| Certificate Issuer |
| Validity Period |
| Subscriber |
| Subscriber's public key information |
| Signature of Issuer |

Fig. 4

CERTIFICATE VALIDITY DATABASE

| Certificate | Status (valid, expired, revoked, suspended) | Supplemental assurance parameters | Links to account history and periodic reporting information |
|---|---|---|---|
| Cert-1 | valid | p | 1 |
| | | | |

Fig. 5

REQUEST MESSAGE 116

| Field | Meaning |
|---|---|
| Certificate ID | Unique identifier for this certificate (issuer, serial number) |
| scope | local or global |
| relying party ID | The identity of the relying party |
| notification address | Address to notify for alerts relating to this certificate. |
| payment information | How this reliance check will be paid |
| monetary value (desired) | amount being relied upon |
| monetary value (minimum) | minimum acceptable assurance |
| signed attributes (signed information 114) | signed by subscriber (include purported monetary value) |
| Request type | The type of request (e.g., validation, reliability). |

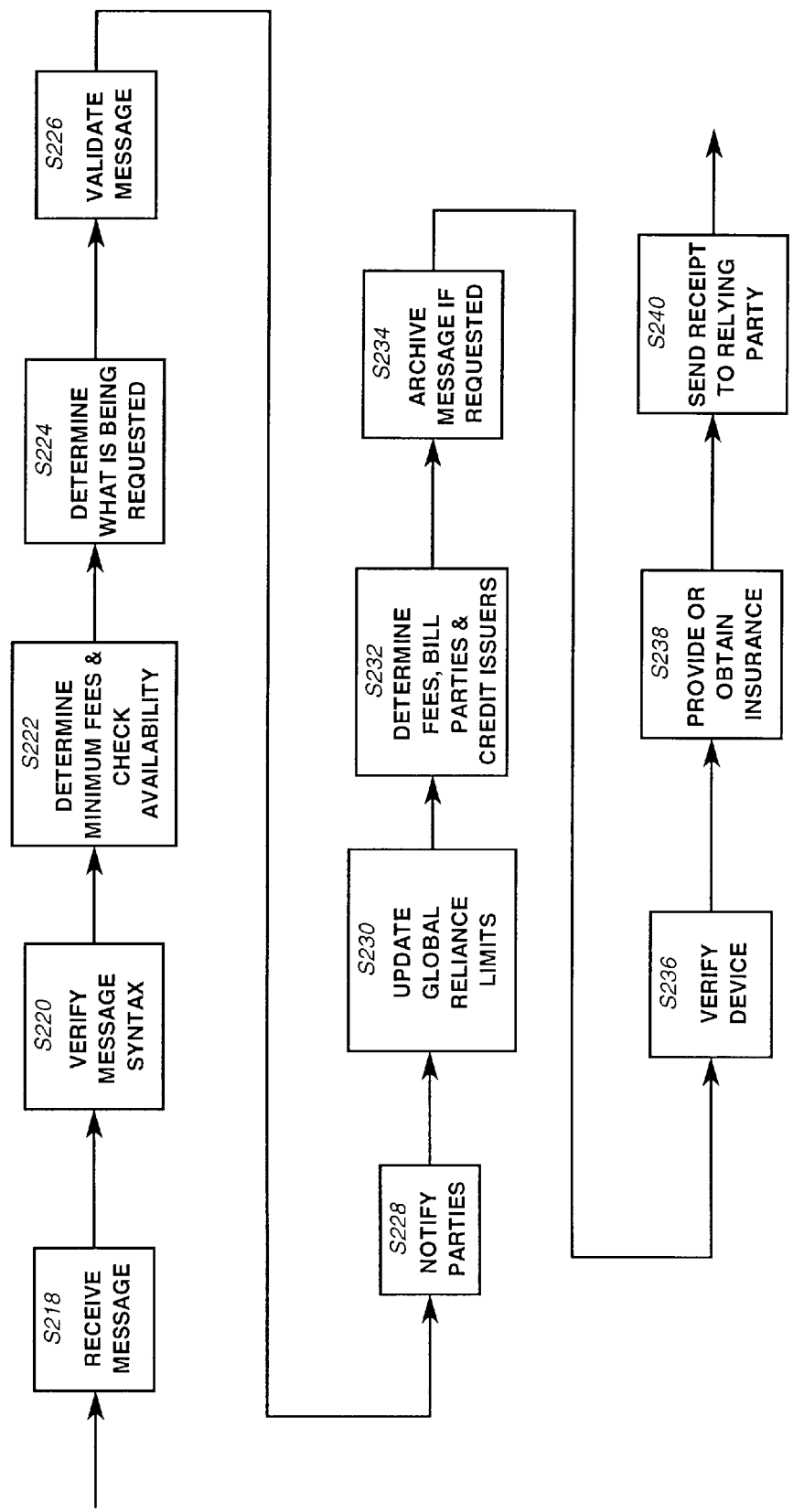

Fig. 11

X.509 Certificate Info

| Version Number |
| Serial Number |
| Algorithm Identifier |
| Issuer Name (CA or Sponsor) |
| Validity Period |
| Subject Name |
| Subject Public Key |

| Subject's Authority Specification (Optional, see ANSI X9.45) |

| Default Reliance Limit (= $0.05) |
| Name/Address of Status Check Service |
| Fee Schedule (SCM, RRM, OLG, Unrely) |
| Permission to Bill User/Third Party (Y/N?) |
| Third Party Name and Acct # (optional) |

| Signature of CA |

RELIANCE SERVER FOR ELECTRONIC TRANSACTION SYSTEM

1. FIELD OF THE INVENTION

This invention relates to electronic transactions, and, more particularly, to services supporting reliance on digital signature certificates and managing the risk of such certificates in an electronic transaction system.

2. BACKGROUND OF THE INVENTION

Systems for accomplishing business transactions electronically are becoming increasingly widespread, partly because of the advent of global computer networks such as the Internet, and partly because of the evolution and maturity of public key cryptography, which enhances the security of such commerce. The application of public key cryptography to electronic commerce has been heretofore envisioned in documents such as Recommendation X.509 of the International Telecommunications Union (ITU, formerly CCITT) (hereinafter "Standard X.509"), the Digital Signature Guidelines of the American Bar Association's Information Security Committee (December 1995 edition, hereinafter "ABA Guidelines"), and statutes and regulations such as the Utah Digital Signature Act, Utah Code Ann. title 46, chapter 3 (1996) (hereinafter "Utah Act").

The backdrop established in these and other documents addresses some problems but leaves many of them unsolved and unresolved.

2.1 Conventional Approaches to Digital Signature Certification

To use secure electronic commerce according to the conventional methods, each user has a pair of related keys, namely a private key (to be kept secret by the user) and a public key (which can be known by anyone without compromising the secrecy of the corresponding private key). Using a particular public key, an algorithm can determine whether the corresponding private key was used to sign or authenticate a given message. For example, if A wishes to send B a message, and provide B with a high degree of assurance that the message is genuinely A's, then A can digitally sign the message using A's private key, and B can thereafter verify that the message is truly A's using A's public key.

A public key is simply a value (generally a number), and has no intrinsic association with anyone, including the person whose message it is to authenticate. Widespread, commercial use of digital signatures requires reliable information associating public keys with identified persons. Messages of those identified persons can then be authenticated using the keys.

Digital signature certificates (sometimes also called public key certificates or simply certificates) meet this need. These certificates are generally issued by trusted third parties known as certification authorities (CAs) and they certify (1) that the issuing certification authority has identified the subject of the certificate (often according to specifications delineated in a certification practice statement), and (2) that a specified public key (in the certificate) corresponds to the a private key held by the subject of the certificate. A structure for public-key certificates is included in the X.509 standard cited earlier. The content of a certificate is often specified in a statute or regulation. A typical X.509 certificate has the format shown in FIG. 1.

In order to assure that a certificate's authenticity can be subsequently verified, the certification authority digitally signs the certificate when issuing it. The issuing certification authority's digital signature can itself be verified by reference to a public key (the certification authority's public key), which is associated with the certification authority in another certificate issued by a second certification authority to the first certification authority. That other certification authority's digital signature can be verifiable by a public key listed in yet another certificate, and so on along a chain of certificates until one reaches a so-called root or prime certification authority whose public key is widely and reliably distributed. For maximum assurance of the authenticity of a certificate relied upon in a transaction, the relying party must, using conventional methods, verify each certificate in the chain. An example of a certification chain is shown in FIG. 2, wherein a root certification authority issues a certificate to certification authority CA-1 which in turn certifies certification authorities CA-2 and CA-5. Certification authority CA-2 certifies CA-3 which certifies CA-4 which certifies subscriber-1. Certification authority CA-5 certifies subscriber-2.

Most legal systems treat a certificate as a representation, finding, or conclusion made pursuant to a contract between the issuing certification authority and the subscriber, i.e., the person identified in the certificate as the holder of the private key corresponding to the public key listed in the certificate. Persons other than the subscriber may rely on the certificate. The certification authority's duties in relation to those relying parties may stem from rules governing representations or false statements, rules treating the relying party as a third-party beneficiary of the contract between the certification authority and subscriber, statutes governing digital signatures, or a blend of all of the above as well as perhaps additional legal principles.

Often, a party's right to rely on a certificate is limited. In the law applicable to misrepresentations, for example, reliance is generally required to be reasonable. Further, reliance on some certificates is specified to be per se unreliable. A bright line separates certain classes of clearly unreliable certificates from all others, and a relying party relies on them at its own peril, without recourse against the issuing certification authority or subscriber for a defect in the certificate. Certificates that are per se unreliable are conventionally termed invalid, and may include any certificate which:

(1) Has expired (i.e., the time of reliance is later than the date specified in the certificate for its expiration);

(2) Has been revoked (i.e., have been declared permanently invalid by the certification authority which issued the certificate); and (3) Is suspended at the time of reliance (i.e. has been declared temporarily invalid by the certification authority which issued the certificate).

In addition, a certificate which has not been accepted by its subscriber or issued by a certification authority should not be considered to have taken effect, and could, perhaps rather loosely, be considered invalid.

Suspending and/or revoking certificates are an important means of minimizing the consequences of errors by the certification authority or subscriber. Depending on applicable legal rules, a certification authority may avert further loss due to inaccuracy in the certificate by revoking it. A subscriber can revoke a certificate to prevent reliance on forged digital signatures created using a compromised, e.g., lost or stolen, private key. Certificates which become invalid by revocation are generally listed in a certificate revocation list (CRL), according to ITU X.509. Suspension, or temporary invalidation, was not contemplated in ITU X.509, and may or may not be included in the CRL. Certificates which become invalid by virtue of their age need not be listed in a CRL because each certificate contains its own expiration date.

As a practical matter, the conventional CRL-based system works as follows. Before a subscriber can create a verifiable digital signature, the signer must arrange for a certification authority to issue a certificate identifying the subscriber with the subscriber's public key. The subscriber receives back and accepts the issued certificate, and then creates digital signatures and attaches a copy of the certificate to each of them. When the other party to a transaction receives such a digital signature, the other party must check with the certification authority, generally via its on-line database, to determine whether the certificate is currently valid. If so, and if the digital signature can be verified by the public key in the certificate, the party is usually in a strong position to rely on the digital signature.

2.2 Problems with the Conventional Approaches to Digital Signature Certification The system summarized above and envisioned in Standard X.509, the ABA Guidelines, the Utah Act, and similar documents has several deficiencies, including:

Little support for risk management: The conventional system provides very few facilities or opportunities to enable a certification authority to manage the risk of certification. The certification authority is not informed when anyone relies on a certificate that the certification authority has issued or the extent to which anyone relies on any certificate it has issued. The certification authority also has no way of monitoring outstanding certificates, ascertaining whether problems arise, evaluating which factors affect the risk of faulty certification or the scope of exposure to risk that the certification authority should prudently undertake. Furthermore, conventional systems provide few facilities to help subscribers and relying parties manage their risks, including the risk of keeping the private key secure.

Relying party is under-served: To a great extent, it is the relying party, not the subscriber, who bears the risk of fraud or forgery in the transaction. If a document is forged or is fraudulently altered, the relying party will suffer the consequences, which, according to the law of most states, is that the message is treated as void. Although the relying party has the keenest interest in the information security of the transaction, the certification authority's service contract is entirely with the subscriber. In the case of a fraud or forgery, the subscriber may even be the perpetrator. The roles of the conventional system thus set the certification authority up to deal with relatively disinterested parties or even perpetrators in problem cases, but to have no contact with the party who primarily bears the loss. This state of affairs exposes the certification authority to serious liability risks in relation to the relying party and causes the certification authority to forgo the business opportunity of serving the relying party. Rather than dealing exclusively with the subscriber, the digital signature infrastructure also needs a way of dealing with the relying party.

Cost front-loaded onto subscriber: Since the certification authority's contract is with the subscriber alone, not with the relying party, the certification authority has no alternative but to recover all costs and profit from the subscriber, even though, as previously noted, the relying party has the principal interest in the security of the signed message.

Lack of robustness: Because the conventional system fails to address risk management and the needs of relying parties, certification authorities have tended to interpret their roles narrowly. A certification authority may, for example, promise to look by rote at an apparent driver's license, or accept at face value a notarized application for certification, without purposefully endeavoring to serve the real business need for certification, which is to assure the expectations of the parties to the transaction. This mechanical approach to certification limits the potential for CAs to add further value to electronic commerce transactions. A more robust system needs to be serviceable for certifying authorization, accreditation, legal status of a juridical entity, and credit, for example.

SUMMARY OF THE INVENTION

This invention solves the above and other problems by providing in an electronic transaction system, a reliance server, an information processing system, which includes some or all of the following features:

(1) Contracts with the relying party, the party receiving and potentially relying on the subscriber's digital signature, to perform services as requested by the relying party.

(2) Automatically performs services as requested by the relying party, services which may include certifying the validity and authenticity of the subscriber's certificate and providing additional assurance of the accuracy and reliability of that certificate in the form of a secondary certificate tailored to the relying party's needs. A secondary certificate is a certificate that is issued automatically based on another certificate and perhaps additional information gathered and maintained by the reliance server.

(3) Monitors the scope of its and the certification authority's exposure in relation to valid certificates by retaining records of services performed in response to requests from relying parties.

(4) Limits and manages the certification risk incurred by itself and the certification authority by evaluating relying parties' requests in relation to certain criteria established in cooperation with the certification authority. Because the risk is bounded and managed, it is more readily insurable.

(5) Informs the subscriber of reliance on the subscriber's certificate and the extent of such reliance and the amount of assurance issued by the reliance server. Frequent reports to the subscriber enable the subscriber to discover problems, and thereby share in the responsibility for timely remedial action.

(6) Informs an insurer of the scope of its underwriting commitment by including the insurer in the information conduit that responds to relying party requests.

As used herein, the term "party" generally refers to an electronic device or mechanism and the term "message" generally refers to an electronic signal representing a digital message. The terms "party" and "message" are used to simplify the description and explanation of the invention. The term "mechanism" is used herein to represent hardware, software or any combination thereof. The mechanisms and servers described herein can be implemented on standard, general-purpose computers or they can be implemented as specialized devices.

This invention is a method of managing reliance in an electronic transaction system. The method includes a certification authority issuing a primary certificate to a subscriber and forwarding, from the certification authority to a reliance server, assurance parameters about the issued primary certificate. The reliance server maintains the forwarded information about the issued primary certificate. The subscriber forms a transaction and then provides the transaction to a relying party, the transaction including the primary certificate issued by the certification authority or an identification of that certificate. The relying party evaluates the transaction sent by the subscriber and determines whether some assurance on the authenticity of the primary certificate is needed in order to "safely" proceed with the transaction. If the relying party determines that assurance is needed, it sends to the reliance server a request for a specific amount of assurance based on the transaction received from the subscriber. Then the reliance server determines whether or not to provide the requested assurance. The reliance server bases its determination on the requested assurance, the assurance parameters about the issued primary certificate received from the certification authority, historical information about assurance that has been issued for this and other certificates to the requesting relying party and other relying parties, and on any other information that might be available. Based on its determination, the reliance server issues to the relying party a secondary certificate providing the assurance to the relying party.

In preferred embodiments, the primary certificate is a digitally signed electronic document of predefined format within which a certification authority makes representations intended for relying parties with which the subscriber will engage in transactions. This primary certificate can be, and in many cases is, an X.509 certificate, as defined in the standard cited earlier. Alternately, the primary certificate can be a certificate which makes representations of the agency or accreditation of a particular individual or organization, or one which provides a promise of payment.

In some cases the primary certificate specifies a reliance limit and the information forwarded by the certification authority to the reliance server includes assurance parameters controlling whether the reliance server can provide assurance based on the primary certificate.

In some cases the assurance parameters include an acceptable reliance limit in excess of the reliance limit specified in the primary certificate, and the request for assurance is a request for reliance on a value in excess of the specified reliance limit. In those cases, the reliance server determines whether to provide the requested assurance by determining whether the requested reliance would exceed the acceptable reliance limit.

In preferred embodiments, the method further includes the reliance server tracking cumulative liability associated with the primary certificate, and determining whether the requested reliance would cause the cumulative liability to exceed the acceptable reliance limit.

In some cases where the requested assurance is for the accuracy of another certificate, the method includes the reliance server checking the current validity and authenticity of the other certificate and then issuing the secondary certificate attesting to the accuracy of the other certificate. The validity checking includes verifying the other certificate's digital signature along a chain of certificates, and checking whether the requested assurance is within the assurance parameters.

In some cases where the requested assurance is for the authenticity of another certificate, the method includes the reliance server checking authenticity of the other certificate and issuing the secondary certificate attesting to the authenticity of the other certificate. The checking includes verifying the other certificate's digital signature along a chain of certificates, and checking whether the requested assurance is within the assurance parameters.

In some cases where the requested assurance is for the validity of another certificate the reliance server checks the current validity of the other certificate; and issues the secondary certificate attesting to the validity of the other certificate. The checking includes determining whether the other certificate has been suspended, revoked, or has expired, and checking whether the requested assurance is within the assurance parameters.

In some cases where the requested assurance is for assurance of an agent's authority, the method includes the reliance server returning documentation of agency with an enveloping secondary certificate attesting to authenticity. The documentation of agency includes a power of attorney.

In some cases where the requested assurance is for assurance of a person's accreditation, the reliance server returns a statement by a licensing or professional body regarding the person's accreditation, with an enveloping secondary certificate attesting to the statement's authenticity.

In some cases where the requested assurance is for assurance of existence and/or good standing of entity, the reliance server returns a statement by a public office in which the entity is incorporated indicating that the entity exists, is in good standing, and is qualified to conduct business, wherein statement is enclosed in the secondary certificate attesting to the statement's authenticity.

In some cases where requested assurance is for assurance of the performance of an obligation, the reliance server issues a statement of assurance of performance, wherein statement is enclosed in the secondary certificate attesting to the statement's authenticity.

Preferably the reliance server and the relying party enters into a contract prior to the reliance server issuing the secondary certificate. The contract can be entered into after the relying party makes its request.

The transaction can include a digital signature.

The assurance parameters transferred from the certifying authority to the reliance server can include a maximum supplemental assurance that can be issued for a particular digital signature. In some cases the assurance parameters include at least one of:

1. a maximum supplemental assurance that can be issued in a single secondary certificate;
2. a maximum supplemental assurance that can be issued to any particular relying party;
3. a maximum supplemental assurance that can be issued during one or more specified time intervals;
4. a maximum number of secondary certificates that can be issued on the primary certificate;
5. a maximum time period during which a secondary certificate may remain valid;
6. a maximum reliance limit that can be listed in a secondary certificate valid for a specified transaction type;
7. specific information that must be submitted by the relying party along with its request in order to provide a basis for the supplemental assurance;
8. an amount of supplemental assurance that the subscriber has prepaid and restrictions on how that prepaid assurance can be issued in a secondary certificate;

9. a requirement that the subscriber approve issuance of supplemental assurance by the reliance server for a secondary certificate to be issued to the relying party before a relying party's request for a secondary certificate can be granted;
10. thresholds which trigger a report being sent from the reliance server to the certification authority;
11. how often the reliance server should report to the certification authority about the extent of supplemental assurance issued on the primary certificate;
12. restrictions limiting disclosure of or access to the primary certificate to specified parties;
13. requirements that the transaction be signed by additional parties besides the subscriber, optionally specify who those additional parties are and what number of them must sign;
14. a scale of the amount of supplemental assurance that can be issued based on the number and identity of additional parties that sign; and
15. information regarding the validity of the primary certificate.

Any of the assurance parameters can be restricted to a particular time period, including the entire period during which the primary certificate is valid.

In another aspect, this invention is an electronic transaction system which includes a certification authority and a reliance server connectable to the certification authority. The certification authority issues primary certificates to subscribers to the system. The reliance server receives from the certification authority information regarding the primary certificates issued by the certification authority. The reliance server issues, upon request from relying parties, secondary certificates to the relying parties, the issuing being based on the information provided by the certification authority and on information provided by the relying parties.

In some embodiments at least one other party is connectable to the reliance server, and the reliance server provides the secondary certificate to the other party prior to issuing the secondary certificate to the relying party.

Preferably the reliance server digitally signs the secondary certificate prior to issuing it to the relying party.

In yet another aspect, this invention is a method of automatic replacement of a subscribers certificate, in an electronic transaction system in which a certification authority issues digital certificates to subscribers. The method includes, a subscriber creating a standby application for certification of a new key pair, digitally signing the standby application with a private key and then destroying the private key. The subscriber then includes the public key corresponding to the private key in a transactional certificate valid only for the standby application and forwards the transactional certificate to the certification authority. The certification authority, keeps the transactional certificate. Subsequently, the subscriber sends the standby application to the certification authority which verifies the digital signature on the application by reference to the transactional certificate and then issues a new time-based certificate listing the public key indicated in the standby application.

As envisioned in another embodiment of the present invention, someone wishing to verify a certificate-based digital transaction produces a reliance-check message including the certificates associated with the transaction and a copy of relevant parts of the transaction (including at least the monetary value encoded in the transaction). This reliance-check message is then sent to the reliance server. The reliance server, upon receipt of a reliance-check message, checks the certificates for validity, and checks for various consistency problems that might indicate compromised trusted devices. The reliance server can also track the cumulative exposure to risk of each certification authority. If the reliance server determines that the risk is acceptable (based on the information in the reliance-check message and on other information it has stored or obtained), it returns a digitally signed reliance server response message to the relying party.

In another embodiment, this invention is a method of managing reliance in an electronic transaction system in which subscribers have digital time-based certificates issued by certification authorities. The method includes, by a relying party receiving a transaction from a subscriber, the transaction including information regarding at least one time-based certificate of that subscriber. The relying party creates a message based on certificate information from the transaction, the message specifying an amount of the transaction upon which the relying party intends to rely. The relying party then sends the message to a reliance server requesting a guarantee for the amount of the transaction upon which the relying party intends to rely. The relying party then receives a voucher from the reliance server in response to sending the message and then continues the transaction with the subscriber based on information in the voucher.

In another aspect of this invention, the method includes, a reliance server receiving a reliance request message from a party, the message specifying an amount of a transaction upon which the party intends to rely and requesting a guarantee for the amount of the transaction, the message including certificate information derived from the transaction. The reliance server determines whether to provide a guarantee for the amount of the transaction and sends a voucher to the relying party, the voucher including an indication of whether the reliance server guarantees the amount of the transaction. The determining includes determining whether certificates associated with the transaction have been revoked or suspended.

The method includes receiving from the certification authority an actual reliance limit for a certificate; storing the actual reliance limit; and determining whether the requested amount would exceed the actual reliance limit. Preferably the reliance server maintains a cumulative liability for a certification authority.

In another aspect, this invention includes, by a certification authority, issuing a time-based certificate to a subscriber, the certificate specifying a stated reliance limit and forwarding to a reliance server an actual reliance limit for the certificate, the actual reliance limit being different from the stated reliance limit.

In another general aspect, this invention is a method of managing reliance in an electronic transaction system in which subscribers have digital certificates. A relying party receives a transaction from a subscriber, the transaction including information regarding at least one certificate of that subscriber. The relying party creates a message based on certificate information from the transaction, the message specifying an aspect of the transaction upon which the relying party intends to rely; and then sends the message to a reliance server requesting a guarantee for the aspect of the transaction upon which the relying party intends to rely. Subsequently, the relying party receives a reply receipt from the reliance server in response to the step of sending the message; and continues the transaction with the subscriber based on information in the reply receipt.

In some cases the subscriber's certificates have associated fees and the reliance server ascertains a fee for its services based on the fees of certificates associated with the transaction. The fees include usage fees, guarantee fees and lookup fees.

In some cases when the message requested certificate status checks, the reply receipt indicates whether the certificate status checks were acceptable. Generally, the receipt indicates whether the reliance server guarantees the aspect of the transaction upon which the relying party intends to rely.

In some cases, the aspect of the transaction upon which the relying party intends to rely specifies a monetary value and the receipt indicates whether the reliance server guarantees the transaction for that monetary value. Preferably the reliance server bases its guarantee on information specified in a certificate associated with the transaction.

In another aspect, this invention includes, by a reliance server, receiving a message from a party thereby requesting a guarantee for an aspect of the transaction, the message including certificate information derived from the transaction; validating information in the message to determine whether to provide the guarantee for the aspect of the transaction; and sending a reply receipt to the relying party, the reply receipt including an indication of whether the reliance server guarantees the aspect of the transaction. The validating includes determining whether certificates associated with the transaction have been revoked or suspended. Sometimes the certificate information included in the message includes unique identifiers for certificates associated with the transaction, and the determining includes looking up unique certificate identifiers on certificate revocation lists. Preferably the determining is performed based on previously obtained information about certificates.

In some case where the aspect of the transaction for which a guarantee is requested is a monetary reliance value, and where at least one certificate associated with the transaction specifies a monetary limit, the validating includes determining whether the monetary reliance value is within the monetary limit specified in the certificate.

The determining also can include obtaining a value of a current cumulative monetary liability for the certificate and then determining whether the sum of the monetary reliance value and the current cumulative monetary liability would exceed the specified monetary limit. Based on this determining, the current cumulative monetary liability is updated.

BRIEF DESCRIPTION OF THE DRAWINGS

The above and other objects and advantages of the invention will be apparent upon consideration of the following detailed description, taken in conjunction with the accompanying drawings, in which the reference characters refer to like parts throughout and in which:

FIG. 1 shows the format of a typical X.509 certificate;

FIGS. 4 and 5 are data structures used by the system according to FIG. 3;

FIGS. 9 and 10 are flow charts depicting the operation of aspects of electronic transaction system according to the present invention;

FIG. 11 shows a format of an X.509 certificate which includes a reliance specification.

DETAILED DESCRIPTION OF THE PRESENTLY PREFERRED EXEMPLARY EMBODIMENTS

As noted above, as used herein the term "party" generally refers to an electronic device or mechanism and the term "message" generally refers to an electronic signal representing a digital message. The terms "party" and are used to simplify the description and explanation of the invention. As used herein, the term "mechanism" is used herein to represent hardware, software or any combination thereof The mechanisms and servers described herein can be implemented on standard, general-purpose computers or they can be implemented as specialized devices.

1. PREFERRED EMBODIMENT

1.A Overview of Preferred Embodiment

Figure 3:
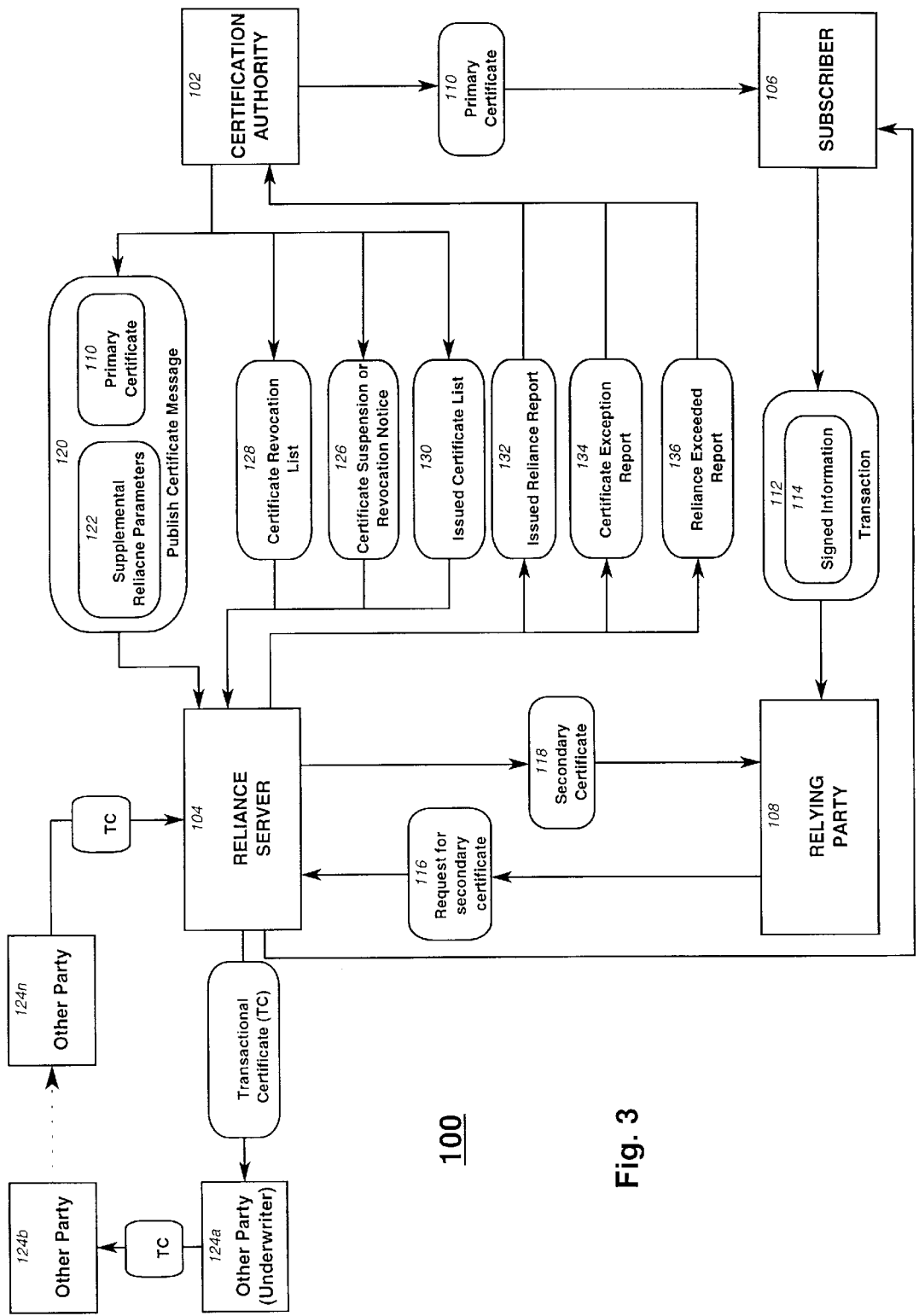
FIG. 3 shows an overview of an electronic transaction system according to a first embodiment of the present invention.

An electronic transaction system 100 according to a preferred embodiment of the present invention is described with reference to FIG. 3. The system 100 includes a certification authority mechanism 102 and a reliance server 104. Subscriber mechanism 106 and relying party mechanism 108 enroll in the system 100 (by enrolling with the certification authority mechanism 102 and the reliance server 104, respectively) in order to participate in it. Upon enrollment in the system 100, a subscriber mechanism 106 is issued an electronic primary certificate 110 by the certification authority mechanism 102. This primary certificate 110 identifies a reliance server 104 and information about this certificate is provided to the reliance server 104 identified in the certificate 110.

Once enrolled, a subscriber mechanism 106 transacts with a particular relying party mechanism 108 by sending the relying party mechanism an electronic transaction 112 including signed information 114. The relying party mechanism 108 determines an aspect of the electronic transaction 112 upon which it intends/wishes to rely and sends to the reliance server 104 identified in the certificate 110 electronic signals representing a request 116 for a secondary certificate. The reliance server determines whether or not to issue the secondary certificate 118 to the relying party mechanism 108 based on information in the request 116, on previous requests based on the primary certificate 110, and information that it has previously obtained from the certification authority mechanism 102 regarding the primary certificate 110.

It is assumed that in a practical implementation of this system contracts which clearly defined the roles and responsibilities of all involved parties will be entered into, either bilaterally or multilaterally, by those parties. One of the key functions of the reliance server is to assure that the relying party mechanism 108 has properly enrolled into the system by entering into required contracts.

The contract with the relying party mechanism 106 is the principal means of making the rules and risk allocations of the system 100 applicable to the relying party. While the contract described herein should be consistent with the emerging law of digital signatures, it provides a uniform, worldwide set of norms, even in legal systems where no law has been designed specifically for digital signatures.

The processes performed by each party and their respective roles are described in more detail below.

1.B Detailed Description of Preferred Embodiment

1.B.1 Certification Authority Issues Certificate to Subscriber

A certification authority mechanism 102 issues a subscriber mechanism 106 a primary certificate 110. The primary certificate is a digitally signed electronic document of predefined format within which a certification authority makes representations intended for relying parties with which the subscriber will engage in transactions. This primary certificate can be, and in many cases is, an X.509 certificate, as defined in the standard cited earlier. Alternately, the primary certificate can be one which makes representations of the agency or accreditation of a particular individual or organization, or one which provides a promise of payment.

The form prescribed by Standard X.509, requires the certificate 110 to include information that identifies the subscriber mechanism 106, states the subscriber's public key, and uniquely identifies the certificate. In this embodiment, certificates are uniquely identified by a combination of the identity of the issuer and a serial number unique with respect to that issuer. In an X.509 certificate, the serial number field distinguishes a given certificate from all others issued by the same certification authority mechanism 102. Consequently, the serial number is unique and never repeats among the certificates issued by a particular certification authority mechanism 102. Since a certification authority mechanism 102 bears a distinguished (or unique) name, the combination of the issuing certification authority's distinguished name and the certificate's serial number identifies that certificate from among all other certificates from any or all CAs.

In some applications of this embodiment, in order to require the relying party to enter into a contract before relying on the primary certificate, the primary certificate 110 may be in Standard X.509 form, except that its public key field is left blank and the algorithm identifier indicates a system relying exclusively on certificates issued directly from a reliance server 104. Alternatively or in addition, certain data in the certificate may be encrypted, and the algorithm identifier indicates a system capable of processing and removing the encryption, in order to make the encrypted data usable.

In addition, based on Utah Act and possibly other statutes and regulations, the certificate 110 can lists a monetary amount, referred to as a "reliance limit" in the Utah, which is a quantified declaration by the issuing certification authority mechanism 102, in light of the degree of security and investigation supporting the certificate, of the maximum extent of reasonable reliance on the certificate in any given transaction without any further investigation. In the preferred embodiment provides for a monetary amount to be entered into the primary certificate by the certification authority serving a purpose similar to that intended by the Utah Act's reliance limit, however, that amount is referred to in the preferred embodiment as the primary assurance limit.

In the preferred embodiment, the primary assurance limit for each issued certificate is set to an amount which the certification authority mechanism 102 considers acceptable in view of its exposure to risk on the primary certificate 110 based on the information that it has collected in identifying the subscriber mechanism 106. If a relying party mechanism 108 receives signed information 114 (including a certificate 110) from the subscriber mechanism 106, and the relying party mechanism 108 desires greater assurance than the primary assurance limit stated in the primary certificate 110 affords, the relying party mechanism 108 must request a secondary certificate 114 from the reliance server 104 associated with that primary certificate 110. The secondary certificate 114 ordinarily states a higher assurance limit than the primary certificate 110 on which it is based. Additional costs are incurred for risk management and quality assurance for this secondary certificate 114 bearing a higher assurance limit, and either the subscriber mechanism 106, the relying party mechanism 108, or both can ultimately bear those costs.

The certification authority mechanism 102 can set a low primary assurance limit in the certificate 110 to necessitate that potential relying parties apply to the reliance server 104 specified in the certificate 110 to obtain supplemental assurance in the form of a secondary certificate 114 stating a assurance limit greater than the primary assurance limit.

1.B.2 Certification Authority Sends Publish Certificate Message to Reliance server When the certification authority mechanism 102 issues a primary certificate 110 to a subscriber mechanism 106, it also sends a Publish Certificate Message 120 to the reliance server 104 which is to issue secondary certificates 118 based on the primary certificate 110. The Publish Certificate Message 120 includes the primary certificate 110 and supplemental assurance (reliance) parameters 122. Multiple reliance servers 104 may do business in a market or similar economy, and the reliance server 104 which the certification authority mechanism 102 selects for publication of a certificate generally depends on bargaining, contracting, and similar market dynamics.

The supplemental assurance parameters 122 that accompany the primary certificate 110 in the Publish Certificate Message 120 include:

1. The maximum supplemental assurance that the reliance server 104 can issue based on the primary certificate 110, cumulated over the validity period of the primary certificate. (In other words, this amount is the total of all assurance limits for all secondary certificates issued by the reliance server 104 based on the primary certificate 110 for as long as it is valid (i.e., for as long as it is not revoked or expired.))
2. The maximum supplemental assurance that can be issued for particular digital signature (as recorded in Signed Information 114).
3. The maximum supplemental assurance that can be issued in a single secondary certificate 118.
4. The maximum supplemental assurance that can be issued to any particular relying party mechanism 108 during a time period, which may be the entire period during which the primary certificate 110 is valid.
5. The maximum supplemental assurance that can be issued during one or more specified time intervals such as a second, minute, day, week, month, or year.
6. The maximum number of secondary certificates 118 that can be issued on the primary certificate 110 during a time period, which may be the entire period during which the primary certificate is valid.
7. The maximum time period during which a secondary certificate 118 may remain valid.
8. The maximum assurance limit that can be listed in a secondary certificate 118 valid for a specified transaction type.
9. Any pricing limits factors which the publishing certification authority mechanism 102 is entitled to state pursuant to the contract between the certification authority mechanism 102 and the reliance server 104.
10. Specific information that must be submitted by the relying party mechanism 108 along with its request 116 for a secondary certificate 118 in order to limit or provide a basis for the supplemental assurance to be issued. Such information might include a specific class of certificate that has been promised to the relying party, specification of a transaction type for the document in which the signed information 114 appears, a second signature (such as by a person approving, endorsing, or otherwise, perhaps with limits, countersigning the relying party's request), and similar relevant information.

11. The amount of supplemental assurance that the subscriber mechanism 106 has prepaid and restrictions on how that prepaid assurance can be issued in a secondary certificate 118 based on any of the other parameters in this list.

12. Any requirement that the subscriber mechanism 106 approve issuance of supplemental assurance by the reliance server 104 for a secondary certificate 118 to be issued to the relying party mechanism 108 before a relying party's request for a secondary certificate 118 can be granted.

13. Thresholds (the point at which a condition is reached that is greater than or less than a specific parameter, percentage of parameter, or specific level of parameter) for assurance which trigger a report being sent from the reliance server 104 to the certification authority mechanism 102. These thresholds apply to any or all of the above parameters and can be stated independently or in relation to and/or dependent on other parameter thresholds. For example, a threshold may require a report when 80% of the maximum assurance on primary certificate 110 has been issued. As another example, a threshold may require a report when 50% of the maximum cumulative assurance has been issued in a given day and 90% of that assurance has been issued to a particular relying party mechanism 108.

14. How often the reliance server 104 should report to the certification authority mechanism 102 about the extent of supplemental assurance issued on the primary certificate 110.

15. Restrictions limiting disclosure of or access to the primary certificate 110 (or copies or information about or derived from it, including reports of its existence and validity) to specified persons (who must be eventually be reliably identified before disclosure or access can be granted).

16. Any requirement that the signed information 114 be signed by additional parties besides the subscriber mechanism 106 and optionally specify who those additional parties are and what number of them must sign, (i.e. a quorum of a larger set of parties may be allowed). Optionally, a scale of the amount of supplemental assurance that can be issued based on the number and identity of additional parties that sign. For example, if only a subscriber mechanism 106 signs, the supplemental assurance maximum per transaction is $125, however, if, in addition, a supervisor and two other people sign, the supplemental assurance maximum per transaction is $1250.

17. Information regarding the validity of the primary certificate 110. The certificate itself specifies its expiration date, however, the certification authority mechanism 102 informs the reliance server 104 of arrangements made with the subscriber mechanism 106 for suspension, revocation, and renewal of the primary certificate being published.

18. Any other limitation or prerequisite for issuance of secondary certificates 118 or for providing supplemental assurance to a relying party mechanism 108 based on the primary certificate 110.

The above specifications depend on enabling provisions made in the contract between a certification authority mechanism 102 and a reliance server 104.

The certification authority mechanism 102 can amend the operative supplemental assurance parameters 122 by sending an amended publish certificate message 120 to the reliance server 104 that published the certificate 110. The amending publish certificate message 120 contains only supplemental assurance parameters 122, includes the primary certificate 110 being updated, and the new supplemental assurance parameters 122.

1.B.3 Reliance Server Processes Publish Certificate Message

When the reliance server 104 receives a publish certificate message 120 from a certification authority mechanism 102, it first checks the digital signature on the publish certificate message 120 and the enclosed primary certificate 110. If the reliance server 104 verifies the signatures (i.e., if the signatures are valid), it stores the publish certificate message 120 for archival and non-repudiation purposes and then extracts information from the publish certificate message 120. The extracted information includes the primary certificate 110 and supplemental assurance parameters 122. The reliance server 104 then checks the information against any specifications for supplemental assurance parameters applicable to primary certificates issued by the certification authority mechanism 102 in question (i.e., the certification authority mechanism 102 that issued the primary certificate 110), and stores the new certificate and its supplemental assurance parameters in a readily retrievable manner. The information is electronically stored by the reliance server 104 in a certificate validity database so as to be accessible by the server as shown in FIG. 4. The information is stored such that, given identification of the primary certificate 110, the reliance server 104 is able to ascertain readily the supplemental assurance parameters 122 applicable to secondary certificates issued or to be issued based on that primary certificate.

The certificate validity database includes, for each primary certificate 110, its validity status (valid, revoked, expired or suspended), and the supplemental assurance parameters 122 applicable to secondary certificates based on the primary certificate, and links to account history and periodic reporting information. (Note that it is not necessary to have an expired status since each primary certificate 110 specifies its life span. However, specifying the expired status obviates the need to examine the actual certificate.)

1.B3.1 Summary of Subscriber Enrollment and Initial Certification

In the system 100, a certification authority mechanism 102 issues an initial primary certificate 110 (one which starts a new account to certify a customer for authentication) by entering into a contract with the prospective subscriber mechanism 106, gathering the information to be listed in the certificate and obtaining and preserving evidence to document satisfaction of the certification authority's duty to confirm the accuracy of that information. The certification authority mechanism 102 then generally restricts assurance on the initial certificate 110 to zero or a low level, and arranges for secondary certificates 118 to be issued subsequently up to a specified assurance limit. The certification authority mechanism 102 then presents the certificate 110 to the subscriber mechanism 106 to determine whether, if issued, it will be acceptable, and then forwards it to management within the certification authority mechanism 102 for approval. Once issuance is approved, the certification authority mechanism 102 creates the certificate in the prescribed form and digitally signs it, often using a highly secure, distributed private key. Thereupon, the certification authority mechanism 102 publishes the certificate with a reliance server 104 (if the contract with the subscriber mechanism 106 provided for publication). The subscriber mechanism 106 then connects with the reliance server 104, accepts the certificate with finality, and the reliance server 104 makes the certificate 110 available on-line.

1.B.3.2 Suspension Process

The certification authority mechanism 102 receives and logs the request to suspend, noting the identity of the requester, the relationship of the requester to the subscriber mechanism 106 (if the requester is not the subscriber), the date and time of the request, the reason or facts underlying the request, and any other relevant information, and duration of the requested suspension. The certification authority mechanism 102 has no obligation to confirm the accuracy of any information provided with the request; however, if the contract between the subscriber mechanism 106 and certification authority mechanism 102 permits, the certifier may investigate, forbear, or limit suspension in circumstances which appear to be a prank or fraud.

The certification authority mechanism 102 generates and publishes notice of the suspension 126 with the reliance server 104 listed in the certificate as the location where notices of suspension or revocation will be posted.

The reliance server 104 updates the certificate status database to indicate the suspension and its duration. If a suspension is already in effect, the reliance server 104 alters the certificate status database to reflect the information on the latest notice.

The reliance server 104 always reports every suspension and every apparent anomaly or irregularity in relation to suspension to the certification authority mechanism 102 which issued the certificate in question.

The certification authority mechanism 102 updates its records to include the notice sent and the acknowledgment returned from the reliance server 104.

The suspension ends automatically when any specified duration of the suspension passes. Suspension for an indefinite period prevents relying parties from closing or carrying forward transactions even though the basis for it lacks confirmation. The contract between the certification authority mechanism 102 and subscriber mechanism 106 should generally preclude suspension by unconfirmed request for an indefinite period. To end a suspension before it is scheduled to end in the notice which effected it, a certification authority mechanism 102 follows a process similar to the one creating the suspension; the certification authority mechanism 102 receives and logs a request and notifies the reliance server 104, which updates the certificate status database.

1.B.3.3 Revocation Process

A reliance server 104 receiving notice of revocation updates the certificate status database to indicate revocation of the certificate and returns an acknowledgment and report to the publishing certification authority mechanism 102. If the reliance server 104 receives a duplicate or subsequent notice of revocation, it logs the second request but makes no other change in the certificate status database, and returns an error message. The reliance server 104 always reports every revocation and every apparent anomaly or irregularity in relation to revocation to the certification authority mechanism 102 which issued the certificate in question.

If a standby certificate application (described below) is available and has been maintained securely, the revocation process explained above can be accomplished automatically without sacrificing documentation or shortcutting the certification authority's duty to confirm the request to revoke. Once a new certificate has been issued based on a standby application, the subscriber mechanism 106 can issue a digitally signed request for revocation, and its digital signature can be confirmed by reference to the certificate newly issued based on the standby application. Such revocation requests, and they can be processed automatically, however, if the subscriber mechanism 106 cannot be re-certified through the standby application process, or if for any reason the subscriber mechanism 106 has no remaining capability of creating a digital signature verifiable by a valid certificate, then the certification authority mechanism 102 must use some means other than a digital signature to confirm the request to revoke, means that usually entail a manual process to accomplish the steps outlined above.

1.B.4. Subscriber Transacts with a Relying Party

The subscriber mechanism 106 accomplishes a transaction with a relying party mechanism 108 by forming a transaction 112. A transaction is formed by the subscriber mechanism 106 digitally signing a document such as a contract, letter, purchase order, or the like. There are several The transaction 112 includes a data structure termed signed information 114 which contains the digital signature and information relating to its eventual verification. After digitally signing the document and attaching the resulting signed information data structure 114 to the signed document, the subscriber mechanism 106 sends the resulting transaction 112 (the document and its signed information data structure 114) to the relying party mechanism 108. The signed information 114 includes the primary certificate 110 issued by the certification authority mechanism 102 to the subscriber mechanism 106. The subscriber mechanism 106 may also include any of the following in the signed information 114 or attached to the signed information 114:

1. A signature identifier which uniquely identifies the digital signature contained in the signed information 114 from any other than this subscriber mechanism 106.
2. The maximum amount of supplemental assurance that the subscriber mechanism 106 permits to be issued for the digital signature within the signed information 114 or the transaction 112 which it authenticates.
3. A list of relying parties 108 who are permitted (or not permitted) to request supplemental assurance for this signed information 114.
4. A list of relying parties 108 who can (or cannot) request supplemental assurance, for which the subscriber mechanism 106 has prepaid, for this signed information 114.
5. A limit on the number of secondary certificates 118 and/or the scope of supplemental assurance that can be issued for this signed information 114.
6. A payment advice indicating that the subscriber mechanism 106 will pay for the supplemental assurance that any or a particular relying party will need for the signed information 114.
7. A statement that reliance on the digital signature is subject to contract, including a specified certification practice statement, which requires a relying party mechanism 108 to at least check the current validity of the certificate in the records of the reliance server 104 specified in the certificate 110.

The subscriber mechanism 106 can use any combination of the above signature parameters to limit the options available to the relying party mechanism 108 and/or reliance server 104 in issuing secondary certificates 118.

1.B.5 Relying Party Examines the Signed Information

In determining whether or not to rely on a digital signature or any other item capable of being assured by a certificate, the relying party 106 receiving the digitally signed document (with transaction 112) evaluates the risk that the party would run if it were to rely on the document without obtaining further assurances. The degree of assurance required may be prescribed in internal operating procedures of the relying party mechanism 108 and determined based on a risk study taking into account both a statistical evaluation of experience and a technical appraisal of prospective vulnerabilities.

The relying party mechanism 108 may well need certification in order for reliance on the on-line transactional to present an acceptable risk. One or more certificates, either for authentication (digital signatures) or for other purposes, provide assurance to the relying party mechanism 108 and lower its risk in relation to issues such as whether a document or transaction is authentic, whether the a purported agent actually has the authority to act for another, and, if an obligation is incurred in the transaction, whether a trustworthy party, such as the certification authority mechanism 102, will assure payment or performance.

Upon receipt of the transaction 112 including the signed information 114 from the subscriber mechanism 106, the relying party mechanism 108 examines it in order to determine the nature of the transaction and the amount of reliance it must place on the signed information. Although the signed information 114 and/or the signed document may be encrypted, it is assumed that they are both intended for the relying party mechanism 108 and that the relying party is capable of decrypting or in some way using the document. It is also possible that the relying party mechanism 108 is, when necessary, able to decrypt part or all of the primary certificate 110 if the certification authority mechanism 102 issued it in an encrypted form. Assuming proper access to and decryption of the transaction 112 by the relying party mechanism 108, the information available to the relying party may well include, in any given transaction:

1. the transactional document received;
2. the signed information 114 data structure and its contents, including the subscriber's digital signature and certificate 110;
3. a monetary amount representing the maximum amount of supplemental assurance that the subscriber mechanism 106 is willing to allocate to the relying party mechanism 108 in this transaction;
4. payment information indicating whether the subscriber mechanism 106 will pay for a secondary certificate 118 providing supplemental assurance to the relying party mechanism 108;
5. any restrictions imposed by the subscriber mechanism 106 in relation to services to be provided by the reliance server 104. These restrictions include listing which relying parties may receive secondary certificates 118 for the transaction 112; and
6. additional information such as referenced, linked, or enveloped documents or data, that the subscriber mechanism 106 has attached to the content information and/or signed information 114.

Based on this and any other available information, the relying party mechanism 108 determines whether or not to request one or more secondary certificates 118 containing supplemental assurance from the reliance server 104. This supplemental assurance lessens certain of the relying party's risks in the transaction and is an engagement by the reliance server 104 and/or the certification authority mechanism 102 that they will bear any losses incurred within the bounds of the supplemental (secondary) assurance provided.

If the relying party mechanism 108 determines that the primary assurance limit stated in the primary certificate 110 is less than the assurance that the relying party mechanism 108 desires, the relying party mechanism 108 can request supplemental assurance from a reliance server 104. To do so, the relying party mechanism 108 composes a request 116 for secondary certificate 118 and sends the request 116 to the reliance server 104.

The request 116 for secondary certificate 118 sent by a relying party mechanism 108 to a reliance server 104 so as to obtain supplemental assurance has the form shown in FIG. 5. The request 116 includes the identifier of the primary certificate 110 containing the subscriber's public key.

The primary certificate 110 included in the signed information data structure 114 lists a reliance server 104 from which supplemental assurance is to be available, and where notice of suspension and/or revocation of the primary certificate 110 is to be posted. The listing of the reliance server 104 in the primary certificate 110 may be an actual address, or it may be a proxy or pointer to a network site listing an actual address. The relying party mechanism 108 may request supplemental assurance from the reliance server 104 listed in the certificate, or it may contact another reliance server, perhaps one with whom the relying party has an existing relationship. The request 116 for secondary certificate 118 contains a field in which the relying party can indicate the scope of the search to be performed. If the reliance server 104 to which the relying party mechanism 108 sends the request 116 cannot fulfill the request, and if the scope-of-search field permits (by indicating a global scope), that reliance server may attempt to locate another reliance server that can fulfill the request. If the scope field permits (i.e., the scope is global) and if the search locates a reliance server that can fulfill the request, the initial reliance server can then forward the request to the other reliance server. On the other hand, if the scope is set to local, then even if the reliance server 104 is unable to fulfill the request it cannot pass the request on to another reliance server.

The request message 116 also includes:

1. a notification address which is where any alerts relating to the certificate (specified by the message) should be sent. This address could be an electronic address (e.g., an e-mail address) or some other form of address;
2. signed attributes (the signed information data structure 114); and
3. a request type specifying the type of assurance being requested (described below).

If the relying party's request for supplemental assurance is granted, this is stated in a secondary certificate 118. A secondary certificate 118 is a message issued and digitally signed by a reliance server 104 or other certification authority mechanism 102. A secondary certificate 118 can certify or assure any fact, status, or obligation material to a transaction, including the following:

1. The accuracy of another certificate, such as an authentication certificate, which identifies a person with a public key.
2. The authenticity of another certificate, by attesting to the fact that the digital signature on other certificate has been verified by reference to a chain of certificates terminating in a root certifier.

3. The validity of another certificate, by determining (if possible and among other things) where notice of revocation or suspension is to be posted and checking that location.
4. The grant by a specified principal of authority to a specified agent.
5. The accreditation of a person by a licensing or professional body.
6. The existence and/or good standing of a person who is a juridical or artificial entity.
7. The performance of an obligation. (A certificate of this type is a guaranty of performance or a letter of credit assuring payment or satisfaction of an obligation.)

The validity of a secondary certificate 118 is generally limited in relation to a specified time and usually up to a specified amount, and may also be limited to a specified relying party mechanism 108, digital signature or transaction, a specified EDI transaction type or transaction set, or according to other criteria as agreed by the reliance server 104 and relying party mechanism 108. If provision of supplemental assurance limits the availability of further supplemental assurance for the subscriber mechanism 106, the subscriber may also limit the amount of secondary assurance provided in a given transaction. The signed information data structure 114 created by the subscriber mechanism 106 in signing the document (and incorporated into a request message 116 as "signed attributes") includes several fields digitally signed by the subscriber mechanism 106 and limiting the availability of supplemental assurance for the transaction to a specified maximum assurance limit. The relying party mechanism 108, in requesting supplemental assurance, specifies a desired amount and a minimum acceptable amount, and the reliance server 104 provides supplemental assurance in the desired amount if it is less than the maximum specified by the subscriber mechanism 106, and if it is not, then in the maximum specified by the subscriber mechanism 106 if it exceeds the minimum acceptable amount indicated by the relying party. If the maximum specified by the subscriber mechanism 106 is less than the minimum amount acceptable to the relying party mechanism 108, then the reliance server 104 returns an error message inviting the relying party to take the issue up with the subscriber mechanism 106.

1.B.6 Reliance server Processes Relying Party's Request

Upon receipt of a request 116 for secondary certificate 118, the reliance server 104 checks whether the relying party mechanism 108 has been enrolled in the system by verifying the relying party's digital signature using the public key linked to a particular contract form and an event in which the relying party assented to the contract. If a record of the relying party's enrollment cannot be found, then the reliance server makes a contractual offer to the relying party, and, if the relying party accepts it, creates a certificate for the relying party, which links the contract to a public key. Any information obtained about the relying party's identity is unconfirmed and is kept on an as-is basis.

If the relying party is enrolled with the reliance server 104, the reliance server fulfills the relying party's request by doing the following, depending on what the relying party requested:

1.B.6.1 Relying party requested assurance of the accuracy of another certificate If the relying party mechanism 108 requested assurance of the accuracy of another certificate, the reliance server 104 checks the current validity of the certificate and its authenticity (by verifying its digital signature along a chain of certificates), and checks whether the requested assurance is within the secondary assurance parameters. If, in light of validity, authenticity, and the secondary assurance parameters, further assurance can be provided, the reliance server 104 issues a secondary certificate 118 attesting to the accuracy of the designated certificate.

1.B.6.2 Relying party requested assurance of the authenticity of another certificate If the relying party mechanism 108 requested assurance of the authenticity of another certificate, the reliance server verifies the digital signature on the certificate by reference to the public key listed in another certificate, and then verifies the digital signature on that other certificate. This process is repeated along a chain of certificates ending with one issued by a root certifier (certification authority, see, e.g., Root CA in FIG. 2). The reliance server 104 also checks each such certificate to determine whether it is valid. If all digital signatures are verified by reference to public keys listed in valid certificates, the reliance server issues a secondary certificate 118 attesting to the authenticity of the other certificate.

1.B.6.3 Relying party requested assurance of the validity of another certificate If the relying party mechanism 108 requested assurance of the validity of another certificate, the reliance server determines from the certificate where validity information is to be posted. If the reliance server 104 is the site of the validity information, it checks its certificate validity database. If that database indicates that the certificate has been issued by its certification authority mechanism 102, accepted by its subscriber mechanism 106, but is not suspended, revoked, or expired, then the reliance server issues a secondary certificate 118 attesting to the current validity of the certificate.

1.B.6.4 Relying party requested assurance of an agent's authority

If the relying party mechanism 108 requested assurance of an agent's authority, the reliance server 104 returns a power of attorney or a similar grant or documentation of agency, with an enveloping secondary certificate attesting to authenticity.

1.B.6.5 Relying party requested assurance of person's accreditation

If the relying party mechanism 108 requested assurance of person's accreditation, the reliance server 104 returns a statement by a licensing or professional body regarding the person's accreditation, with an enveloping secondary certificate 118 attesting to the statement's authenticity. The statement of accreditation can be a certification authority disclosure record, e.g., as described in the Utah Act and the administrative rules based thereon.

1.B.6.6 Relying party requested assurance of existence and/or good standing of entity If the relying party mechanism 108 requested assurance of the existence and/or good standing of a juridical or artificial entity, the reliance server 104 returns a statement by the public office in which the entity is incorporated or otherwise created indicating that the entity exists, is in good standing, and/or is otherwise qualified to conduct business. The statement is enclosed in a secondary certificate 118 attesting to the statement's authenticity.

1.B.6.7 Relying party requested assurance of the performance of an obligation

If the relying party mechanism 108 requested assurance of the performance of an obligation, the reliance server 104 issues a letter of credit or other guaranty or assurance of payment, if credit is available and appropriate arrangements have been made with the subscriber mechanism 106.

The reliance server 104 performs the above actions, including the issuance of secondary certificates 118, automatically based on previously specified criteria.

Performance of the above actions can fail for a number of reasons, in addition to system malfunction or down time. If possible, when a request cannot be fulfilled, the reliance server 104 returns to the relying party mechanism 108 an error message, such as:

Certificate expired

The certificate has expired according to its own expiration field.

Certificate revoked

Notice of revocation had been posted at the location specified in the certificate, or was otherwise found by the requested search. The message includes the date of revocation.

Certificate suspended

Notice of suspension had been posted at the location specified in the certificate, or was otherwise found by the requested search. Further information about the duration of the suspension, the grounds for or cause of it, and the event triggering the suspension is provided where available.

Search Failed

The certificate could not be found.

Multiple certificates found

Two certificates were found identified by the same, supposedly unique identifier. This error indicates a defect in the reliance server system.

To sign and issue the secondary certificate 118, the reliance server 104 may send it (as an intermediate transactional certificate) to certain other parties 124a–124n, perhaps including any of the following:

a. An underwriter mechanism 124a which insures or otherwise aids in bearing the risk of certification; and
   b. A fail-safe database, which is a clone of the reliance server's database, and which assures that any tampering with the reliance server's database is detected.

The other parties 124a–124n execute functions which result in a digital signature on the secondary certificate 118. Generally, the signing technology used is multi-step signing, which is disclosed and described is U.S. patent application Ser. No. 08/462,430, titled "Multi-step Digital Signature Method and System" to Sudia, which is hereby fully incorporated herein by reference.

1.B.7 Reliance server Maintains History of Transactions

The reliance server 104 and/or its agent(s) maintains a history of all secondary certificates that are issued. This information is useful in determining anomalies in the use of certificates and in determining whether secondary or renewal certificates should be issued.

1.B.8 Reliance server Account Statements to Subscriber

Subscriber Account Statements

Periodically, while the initial primary certificate 110 or one of its replacements is valid, the reliance server 104 which is designated to provide assurance for that certificate sends electronic reports of account status to the subscriber mechanism 106. The subscriber receives these account status reports as often as the subscriber wishes but preferably no less frequently than every month. One option for specifying an account status update interval, whereby an update report is provided to the subscriber mechanism 106 whenever it sends another request to a reliance server 104. This option causes the reliance server to tack on an account statement whenever the user obtains other information from the reliance server 104 where the certificate is published. This information includes, e.g., a report on the current validity of another person's certificate or a secondary certificate for increased assurance.

Account statements need not appear as separate messages to the subscriber mechanism 106, unless the subscriber chooses to view them as such when they arrive. Rather, account statements update information accumulated by the subscriber mechanism 106 in a local database. The information received in account statements can be sorted and viewed on a per-signature or chronological basis, with the chronology determined by either the date on which a relevant digital signature was created or when a particular account statement was received.

Account statements report the following information to the subscriber mechanism 106:

1. Validity of subscriber's (time-based) certificates: list all (time-based) certificates issued to the subscriber mechanism 106, starting with the most recent, and indicate which is currently valid and when invalidated certificates were suspended or revoked, or when they expired.

2. Secondary certificates issued: When the reliance server 104 issues a secondary certificate, the reliance server 104 reports the issuance of that secondary certificate in the next account statement. The statement indicates details such as amount, the name of the person who requested the secondary certificate (if identified), and the name of the guarantee if the secondary certificate includes supplemental assurance. The subscriber mechanism 106 can use this report to determine whether a compromise has occurred, since unanticipated usage of assurance, especially by strangers, could in some circumstances indicate that forged or at least unexpected digital signatures have been created. Digital signatures are numbered and time-stamped in the system 100 in order to facilitate the subscriber's review of assurance usage.

3. Assurance balance: The assurance portion of the account statement also indicates the applicable assurance limits and how much assurance has been issued in relation to each limit. The subscriber mechanism 106 correlates this information with digital signatures that have been created, including digital signatures for which no secondary certificates have been requested. Such digital signatures may present an outstanding, unmet need for assurance, and the subscriber mechanism 106 may wish to assess whether such an unmet need can be met by the balance of assurance remaining.

4. Assurance termination: When a assurance guaranty expires or deadline (if any) for filing claims on a secondary certificate passes, the assurance balance for the primary certificate is increased accordingly. The account statement reflects those increases and reports when assurance is scheduled to terminate.

Account statements may also return information regarding other electronic services such as other account transactions and balances, and information on other financial and commercial services. The subscriber mechanism 106 cumulates all information reported in periodic account statements until the subscriber mechanism 106 deletes or archives the information.

Account statements return to the subscriber mechanism 106 the information necessary to discover and resolve problems, and thereby help manage the risk of rendering certification and assurance services. A bank's liability to its customer is lessened if the customer's failure to discover and take corrective action contributed to the problem.

Incident Tracking and Account Histories

Besides account statements returned to subscribers, the certification authority mechanism 102 issuing a primary certificate (including an initial primary certificate) and the reliance server 104 issuing secondary certificates based on that primary certificate track the history of the primary certificate and its dependent secondary certificates, and note all incidents related thereto that arise. Incidents are events or belatedly acquired information relevant to issuance of the initial certificate that may indicate difficulties or problems with the account or the primary certificate, or may in some instances prove to be innocuous if further information were available. The seriousness of incidents varies according to the degree to which a likely problem can be inferred. Incidents relating directly to certification for authentication, and their relative seriousness on a scale of 1 through 5, include:

1. Claim filed (level 5): A relying party files a claim based on a secondary certificate, or makes any demand or initiates a lawsuit based on a certificate issued in the system 100.
2. Fraud or similar allegations (level 5): A party in a civil or criminal proceeding, arbitration, or other dispute or investigation alleges that the subscriber mechanism 106 committed any significant form of fraud, misrepresentation, or other false statement.
3. Suspension or revocation requested (level 1): The subscriber mechanism 106 asks a certification authority mechanism 102 to suspend a time-based certificate. Repeated suspensions or revocations may indicate a lack of desirable care in maintaining the security of the private key.

An account history cumulates as much information as possible about a single subscriber's certification or certifications. The information is gathered for multiple primary certificate certificates and other certifications for the same subscriber mechanism 106 over time and across different certification authorities and reliance servers. The information is also obtained from reliance servers and from external sources such as courts.

Both certification authorities issuing a primary certificates and reliance servers keep track of this information and exchange incident report messages to update each other and a central account history database under the direction of the root certification authority. Information is retained online and archived as prescribed in an account history retention schedule specified for the system 100.

The information exchanged between the reliance server 104 and the certification authority mechanism 102 includes:

1. certificate revocation lists (CRLs) 128;
2. certificate suspension or revocation notices 126;
3. issued certificate lists 130;
4. issued assurance reports 132;
5. certificate exception reports 134; and
6. assurance exceeded reports 136.

Incident reports and records cumulated or derived from them may not be disclosed to anyone other than a certification authority mechanism 102 issuing in good faith a certificate to the subscriber mechanism 106 which is the subject of the incident, such a certification authority's parent certification authority, a reliance server 104 issuing a secondary certificate on the subject subscriber's account, and the root certification authority. In addition, account history information is subject to legal data protection requirements that may further limit availability in some legal systems or require disclosure of account history information to the subscriber mechanism 106.

1.B.9 Billing and Payment

The digital messages described above (transaction 112 and request 116) include price and payment authorization information to enable costs to be allocated and paid according to contracts between the various parties. The system 100 is flexible in enabling costs to be passed through to other parties and allocated as they may decide. In particular, the fees for publication of certificates or notices of revocation by the reliance server 104 can be paid by the certification authority 106 or the subscriber mechanism 106, and fees for secondary certificates can be paid by the subscriber mechanism 106 or relying party mechanism 108. Relying parties and subscribers can obtain a pricing schedule automatically by request to a reliance server 104.

EXAMPLE

Suppose, for example, that a certification authority, Cedric, issues a certificate, Cert-1, to a subscriber named Susan as provided in a contract with Susan. Cert-1 specifies that it is to be used with a "Type C" reliance server system, and also specifies its public key encrypted. Cert-1 specifies a assurance limit of $0; in other words, no reliance is permitted on Cert-1. Cedric provides a copy of Cert-1 to subscriber Susan, and she accepts it. Since Cert-1 is not, in itself, reliable in view of its $0 assurance limit, its essential utility is to direct relying parties to a reliance server. As the contract with Susan provides, Cedric publishes Cert-1 with Margaret, a reliance server.

Margaret establishes a new certification account and an entry in her certificate validity database for Susan's certificate, and sets parameters to govern the automatic issuance of secondary certificates based on information provided by Cedric. Margaret thereupon sends an initial message to Susan to inform her that the publication is completed and she can expect to receive periodic account statements.

Susan sends an offer to Perry to buy certain goods for $10,000. Susan digitally signs her offer and attaches a copy the keyless version of Cert-1.

To determine whether Susan's offer is genuine, Perry runs a verification function, which reports that the digital signature appears to be verifiable by the public key in the certificate, but that the certificate has a $0 assurance limit and supplemental assurance is available from Margaret. Perry sends a request to Margaret for supplemental assurance for the certificate in an amount not less than $10,000. Margaret's system responds with a secondary certificate, Cert-2, which envelopes Cert-1 and specifies that its accuracy and reliability are assured in the amount of $10,000, in relation to Perry and his assignees only and for the digital signature on Susan's offer only. Because Susan did not authorize payment for Cert-2 from her account, Perry pays Margaret's fee for issuance of the secondary certificate.

To issue the secondary certificate that Perry received, Margaret's system parsed and analyzed his request, checked the validity of Cert-1, checked its authenticity by verifying its digital signature and other digital signatures along the certificate authenticity chain, and checked the requested amount of supplemental assurance in relation to the parameters specified for Susan's certification account. After all checks returned affirmative results, Margaret's system issued Cert-2.

If Perry had been concerned about Susan's authority to make the offer on behalf of someone else, or about Susan's ability to pay the $10,000 for the widgets, Perry could have obtained additional supplemental assurance. He could have obtained a copy of a power of attorney authorizing Susan to make the offer, and a letter of credit from Margaret (or her bank, if Margaret is not a bank) assuring payment of the price. Supplemental certificates need not be requested when a digital signature is verified. Obtaining a letter of credit, for example, may be more timely after Perry sends his digitally signed acceptance of Susan's offer to her.

1.B.10 Suspending and Revoking Certificates

Suspension and revocation are the means by which a subscriber mechanism 106 and certification authority mechanism 102 can relieve themselves of the responsibilities and risks of a certificate before it expires. Revocation permanently ends the validity of a certificate, and suspension interrupts it temporarily. While the certificate is invalid, the subscriber mechanism 106 is not under a legal duty to safeguard the private key, the representations of the certification authority mechanism 102 in the certificate have no further effect, and reliance on the certificate is almost certainly unreasonable.

However, notice of suspension or revocation need not ordinarily include identification of the subscriber mechanism 106, since the certificate can be identified by its serial number. In the system 100, publication at the location specified in the certificate directs the notice to a reliance server 104. Which reliance server 104 receives and processes an incoming notice depends on the location specified in the certificate as the location where notice of suspension or revocation will be posted.

1.B.11 Suspension Process

Each reliance server 104 maintains a certificate validity database, preferably a high-speed relational database, which accumulates and makes available on-line all notices of suspension and revocation received from certification authorities. A user may browse or query the certificate status database manually to search for notice of a particular certificate's suspension or revocation, but to gain a higher level of efficiency and assurance, a user can obtain a certificate indicating that no notice of suspension or revocation is on file. In other words, on request, a reliance server 104 will issue automatically and at high speed a certificate affirming that the accumulated notices published with the reliance server 104 as of a certain date and time do not include a notice of revocation of a specified certificate, and that the accumulated notices do not include a notice of suspension which is in effect as of that date and time.

The certification authority mechanism 102 receives and logs the request to suspend, noting the identity of the requester, the relationship of the requester to the subscriber mechanism 106 (if the requester is not the subscriber), the date and time of the request, the reason or facts underlying the request, and any other relevant information, and duration of the requested suspension. The certification authority mechanism 102 has no obligation to confirm the accuracy of any information provided with the request; however, if the contract between the subscriber mechanism 106 and certification authority mechanism 102 permits, the certifier may investigate, forbear, or limit suspension in circumstances which appear to be a prank or fraud.

The certification authority mechanism 102 generates and publishes notice of the suspension 126 with the reliance server 104 listed in the certificate as the location where notices of suspension or revocation will be posted.

The reliance server 104 updates the certificate status database to indicate the suspension and its duration. If a suspension is already in effect, the reliance server 104 alters the certificate status database to reflect the information on the latest notice.

The reliance server 104 always reports every suspension and every apparent anomaly or irregularity in relation to suspension to the certification authority mechanism 102 which issued the certificate in question.

The certification authority mechanism 102 updates its records to include the notice sent and the acknowledgment returned from the reliance server 104.

The suspension ends automatically when any specified duration of the suspension passes. Suspension for an indefinite period prevents relying parties from closing or carrying forward transactions even though the basis for it lacks confirmation. The contract between the certification authority mechanism 102 and subscriber mechanism 106 should generally preclude suspension by unconfirmed request for an indefinite period. To end a suspension before it is scheduled to end in the notice which effected it, a certification authority mechanism 102 follows a process similar to the one creating the suspension; the certification authority mechanism 102 receives and logs a request and notifies the reliance server 104, which updates the certificate status database.

1.B.12 Revocation

A reliance server 104 receiving notice of revocation updates the certificate status database to indicate revocation of the certificate and returns an acknowledgment and report to the publishing certification authority mechanism 102. If the reliance server 104 receives a duplicate or subsequent notice of revocation, it logs the second request but makes no other change in the certificate status database, and returns an error message. The reliance server 104 always reports every revocation and every apparent anomaly or irregularity in relation to revocation to the certification authority mechanism 102 which issued the certificate in question.

If a standby certificate application (described below) is available and has been maintained securely, the revocation process explained above can be accomplished automatically without sacrificing documentation or shortcutting the certification authority's duty to confirm the request to revoke. Once a new certificate has been issued based on a standby application, the subscriber mechanism 106 can issue a digitally signed request for revocation, and its digital signature can be confirmed by reference to the certificate newly issued based on the standby application. Such revocation requests, and they can be processed automatically, however, if the subscriber mechanism 106 cannot be re-certified through the standby application process, or if for any reason the subscriber mechanism 106 has no remaining capability of creating a digital signature verifiable by a valid certificate, then the certification authority mechanism 102 must use some means other than a digital signature to confirm the request to revoke, means that usually entail a manual process to accomplish the steps outlined above.

1.B.12.1 Suspending and Revoking Secondary Certificates

Once a reliance server 104 has issued a secondary certificate, it can suspend or revoke the certificate in the manner described above for a time-based certificate. A subscriber mechanism 106 nearly always suspends or revokes the primary certificate because the most common reason for the subscriber to suspend or revoke, a compromise of the security of the private key, affects the entire primary certificate and all assurance based on it. A reliance server 104 immediately and automatically revokes all secondary certificates issued based on a primary certificate, but such revocation usually comes too late.

Generally the relying party requests a secondary certificate immediately before relying on a digital signature. Once a relying party receives the secondary certificate and relies, it is too late for the revocation of the secondary certificate, or of the primary certificate, for that matter, to have any significant effect. It may prevent further reliance by the same or other parties, but the rights of the relying party have become vested at that point, and those rights can be assigned, even though the underlying digital signature became unreliable thereafter.

Moreover, issuing a secondary certificate and revoking it immediately thereafter could well be viewed as entrapping or failing to deal in good faith with the relying party. The rules of the system 100 and the contract with the relying party prevent a reliance server 104 from revoking a certificate within five minutes of its issuance.

As a practical matter, therefore, suspension or revocation of a secondary certificate is not likely come in time to save a subscriber mechanism 106 or certification authority from a loss. Thus, while secondary certificates can be and are revoked in the system 100, suspension and revocation of the primary certificate are the principal means preventing harm based on a certification gone awry.

1.B.13 Expiration and Replacement of a Time-Based Certificate

A time-based certificate expires at the end of the validity period specified therein. Expiration occurs automatically, without an affirmative act on anyone's part at the time specified for expiration in the time-based certificate. To provide complete information to relying parties about the status of a certificate, information on expiration is included in the certificate status database.

An expired time-based certificate can be replaced through issuance and acceptance of a new certificate identifying the same subscriber mechanism 106 but listing a new public key. The cryptographic key pair certified in a time-based certificate has a limited lifetime since technological improvements may render the security of the key pair vulnerable to an attack facilitated by the availability of an accumulating body of ciphertext. An old, expired certificate should therefore not be reissued as-is with its old public key.

The process for reissuing a replacement certificate to the same subscriber mechanism 106 is essentially the same as for issuing an initial certificate, except that confirmation is easier, because the evidence obtained to confirm information in the previous certificate can aid in confirming the information in the new certificate. Stale information may need updating, and a certification authority mechanism 102 should always be alert to indications of inaccuracies, but building on an existing information base with an accumulating account history makes re-issuance of a subsequent certificate a simpler and less costly and risky process for the certification authority mechanism 102. Whereas issuing a new certificate with adequate confirmation may be difficult or risky without an in-person contact, re-issuance of a replacement certificate in a trouble-free account and without a greatly increased assurance level could well be done by telephone or by a digitally signed request before the expiration of the old certificate.

1.B.14 Automatic Replacement of a Time-Based Certificate

Since replacement of a time-based certificate lends itself to automation better than initial issuance, some time-based certificates may have rather short validity periods but be automatically replaceable. A short initial validity period with automatic replaceability can accommodate, in particular:

Experimenters: Some subscribers may be uncertain whether digital signatures and certification will prove valuable or serve their needs.

Nervous subscribers: A brief validity period alleviates concern about retaining a private key securely for long periods or other risks of electronic commerce, but allows the subscriber mechanism 106 to extend validity in a convenient manner, perhaps as comfort increases.

Lack of history: Potential subscribers who are new to the community or appear to have little relevant history present a greater risk than better known applicants. Use of short-term, replaceable certificates gives a relatively unknown subscriber mechanism 106 a chance to establish a track record.

Instability: Certificates listing information that is likely to require updating can be made to expire soon so that their subscribers can replace them and update the certified information.

Moreover, and perhaps most importantly, a short validity period limits the risk of loss due to a compromise of a private key. The more frequently a subscriber's digital signature capability (including the private key) is regenerated, the less the risk of failing to safeguard any particular private key, since the lifetime of the corresponding certificate is shorter.

However, although automatic replacement is often advantageous, a certification authority mechanism 102 should not permit automatic replacement of a time-based certificate in all possible circumstances. Whether or not to permit automatic replacement and under what circumstances is to some extent left to the discretion of a the certification authority mechanism 102 issuing a certificate, in cooperation with the reliance server 104 and assurance underwriter, who are affected by replacements in relation to assurance. For each subscriber mechanism 106 account, the certification authority mechanism 102 includes an field indicating the number of times the time-based certificate may be replaced automatically, and the value in this field is decremented whenever an automatic replacement process succeeds. If the field is zero, the certification authority mechanism 102 does not initiate the automatic replacement process. The value is set initially by the certification authority mechanism 102 issuing the certificate being replaced. The discretion (of the certification authority mechanism 102 as to whether and under what circumstances to permit automatic certificate replacement) is limited in the system 100, which precludes automatic replacement where:

Change in identifying information: Certain fields in the reliance servers and certification authorities databases, particularly fields containing information identifying the subscriber mechanism 106, cannot be updated by an automatic certificate replacement process. If identifying information in the subscriber's application does not match what is already in the reliance server database, the application is routed to the issuing certification authority mechanism 102 and from there to a registrar, who can contact the subscriber mechanism 106 to confirm the change in identifying information.

Increase in assurance: A certification authority mechanism 102 or reliance server 104 (in cooperation with a assurance underwriter) may refuse to increase assurance at all in an automatically replaced certificate, or may restrict the rate of increase by means of automatic replacement in accordance with the soft and hard ceilings and other requirements specified for the assurance limits.

No authentication capability: Issuance of a replacement certificate must be based on adequate documentation of the continuing accuracy of the information to be listed in the new certificate and of the subscriber's acceptance of the new certificate. To replace a certificate electronically, a subscriber mechanism 106 must authenticate an application and acceptance. If the certificate to be replaced is no longer valid and no other valid authentication certificate or standby application for certificate replacement (described below) exists for the subscriber mechanism 106, the subscriber can no longer replace the certificate by electronic means.

Troubled history: The account history records of the certification authority mechanism 102, which are correlated with reliance servers and a central repository, list incidents rising to a level of seriousness specified in the certification authorities contract with the reliance server 104. In other words, the certification authority mechanism 102 and reliance server 104 agree that automatic replacements will not be processed if incidents are found having a certain level of gravity.

The reliance server 104 keeps track of the number of times an initial certificate may be automatically replaced, a number that may be zero. Like is suspension and revocation, the automatic replaceability of the certificate is determined initially by the certification authority mechanism 102 issuing it and is published in the reliance server 104 and made available from there to end users, including the subscriber mechanism 106 receiving account statements. If a certificate cannot be automatically replaced, its subscriber mechanism 106 can apply to have a new certificate issued as described above.

To replace a time-based certificate automatically, a subscriber mechanism 106, certification authority mechanism 102, and reliance server 104 interact as follows:

The subscriber initiates the replacement process: The subscriber mechanism 106 keeps track of the validity of the subscriber's certificate and chooses to replace it when it is about to expire. The subscriber mechanism 106 learns of revocation or suspension of the certificate through account statements from the reliance server 104, and then initiates replacement using a standby application. Prompts can be given, at the subscriber's option, when the subscriber mechanism 106 uses the system, for example, when the subscriber mechanism 106 attempts to create a digital signature without a valid certificate by which the signature can be verified.

The subscriber applies for a new certificate: Once the subscriber mechanism 106 triggers the replacement process, it creates a new application listing the information in the old certificate. The subscriber mechanism 106 reviews the application form and makes any needed changes, then generates a new key pair and includes the public key and a sample digital signature in the application. The subscriber mechanism 106 then digitally signs the application using the private key of the subscriber's old certificate, if it is still valid. Since the application includes and presents to the subscriber mechanism 106 all information that will be listed in the certificate, the subscriber mechanism 106 also accepts the certificate to be issued in the application. The subscriber mechanism 106 then sends the replacement application to either the certification authority mechanism 102 which issued the certificate to be replaced or the reliance server 104 named in that certificate, depending on the contract between them. The place to apply for a replacement is stored in the subscriber's system when the subscriber mechanism 106 accepts the certificate and obtains an initial account statement.

The certification authority mechanism 102 or reliance server 104 issues the new certificate: The certification authority mechanism 102 checks the application, and, if it can be automatically processed, creates a new certificate from it and digitally signs it. If the certification authority mechanism 102 issues the certificate, it forwards it for publication with the reliance server 104, all without human intervention. If the reliance server 104 issues the certificate, it notifies the certification authority mechanism 102 which issued the replaced certificate, if required by contract with that certification authority mechanism 102. If automatic replacement is not permitted, then the application for replacement is forwarded for processing by a registrar.

The reliance server 104 publishes the certificate and updates the subscriber's certificate status database record to indicate a new primary certificate and its new expiration date, and adjusts the Assurance limits according to the contract between the reliance server 104 and the certification authority mechanism 102 issuing the primary certificate. The reliance server 104 acknowledges receipt and reports updating to the certification authority mechanism 102 publishing the certificate, and updates the subscriber's records kept by the system when issuing the next account statement.

Automatic replacement is based ultimately on the time-based certificate being replaced, the assurance limits and their monitoring, and the account history records accumulated since enrollment of the subscriber mechanism 106. It makes the most of those processes and, in effect, prevents termination or interruption of a certification account when termination or interruption does not appear to be warranted in light of accumulated evidence. However, since the automatic replacement process overrides the effect of certificate expiration, suspension and revocation of a certificate become all the more important.

1.B.15 Automatic Replacement Using a Standby Application

A certificate can be replaced automatically only if its subscriber mechanism 106 can electronically and reliably authenticate the information to be listed in the new certificate and accept it, since the certification authority mechanism 102 issuing the replacement must document confirmation of the information in the new certificate and the acceptance of the new certificate. If the subscriber mechanism 106 has no valid certificate remaining, the subscriber can no longer create a sufficiently reliable digital signature.

To relieve this predicament, the subscriber mechanism 106 stores a digitally signed standby application for certification of a new key pair, an application which can be used to obtain a new certificate if critical, digitally signed information in the application does not need to be updated. When a subscriber mechanism 106 applies for a new initial certificate, the system creates two applications. One is forwarded to a certification authority mechanism 102 for issuance of a new certificate, and the other is cryptographically sealed and stored in the subscriber's system as a standby application. The standby application contains its own public key different from any other on the subscriber's system, and the corresponding private key is stored in a safe place in the subscriber's system.

A standby application is digitally signed by a private key which is destroyed immediately after it is used to sign the standby application. The corresponding public key is included in a transactional certificate valid only for the standby application and forwarded to the certification authority mechanism 102 along with the main application. The certification authority mechanism 102 keeps the transactional certificate on file in case the subscriber mechanism 106 sends the standby application which the certification authority mechanism 102 will need to verify using the public key in the transactional certificate.

If the subscriber mechanism 106 cannot replace a certificate by means of a regular application digitally signed by an existing and valid digital signature capability, the subscriber mechanism 106 can use the standby application. The subscriber mechanism 106 detects that no valid certificate is outstanding and ascertainable, so it uses the standby certificate, provided that no critical information identifying the subscriber mechanism 106 has changed. If the identifying information in the standby certificate is still accurate, the subscriber mechanism 106 sends the standby application to the subscriber's certification authority mechanism 102, which verifies the digital signature on the application by reference to the transactional certificate kept on file for such situations. The certification authority mechanism 102 then issues a new time-based certificate listing the public key indicated in the standby application. The subscriber mechanism 106 then unwraps the private key stored away for use in the event that a certificate is issued based on the standby application.

Once the subscriber mechanism 106 has obtained a new certificate using the standby application, the subscriber mechanism 106 can send a new regular application to replace the subscriber's certificate at any time before it expires. The process for creating and sending the regular application creates and stores away securely a new standby application and standby private key.

The event triggering issuance of a new certificate based on a standby application is the sending of the standby application to the certification authority mechanism 102. The certificate issued in response to the application always lists as subscriber mechanism 106 the person identified in issuing a previous certificate in order to minimize the chance of issuing a certificate to an impostor. Sending a standby application does not by itself affect any other outstanding certificate, although the subscriber mechanism 106 may use the new certificate to make a request to revoke another certificate capable of being authenticated.

The contract between a subscriber mechanism 106 and a certification authority mechanism 102 may limit or preclude use of a standby application. However, use of standby applications and automatic replacement will probably prove convenient for most subscribers and make possible shorter validity periods on time-based certificates, which limit the risk of holding any particular private key.

1.B.16 Comments on Risk

Risk is essentially the chance that one will suffer a loss, and its maximum equals the amount of the potential loss. Risk management consists fundamentally and for the most part of (1) minimizing the probability and the potential loss, and (2) spreading the risk that cannot efficiently be eliminated. Despite best efforts to minimize risk, some possibility of loss usually remains. This residual risk is best borne by spreading it among a large number of similarly situated risk bearers, so that it becomes a moderate, known cost rather than the chance of a crippling catastrophe befalling a single enterprise. In the preferred embodiment, the technology and prescribed or recommended practices minimize risk, and assurance underwriters spread the risk among certification authorities and others by means of insurance, pooling arrangements, and other techniques for distributing residual risk in a broad-based manner.

Multidimensional validity limits and two-stage certification enable the system to manipulate with precision the system's exposure to risk, while offering a high degree of assurance tailored to the needs of each relying party. Generally, an initial certificate and its replacements have little or no assurance, but higher-assurance secondary certificates are available from a reliance server on request, based on the initial certificate. Defining the scope of assurance in a customized secondary certificate lets the relying party proceed with a clear understanding of the precise extent of the assurance provided for a digital signature. It also lets the system manage the other side of assurance, the risk that a loss due to reliance will occur for which a participant in the system will be liable.

2. SECOND EMBODIMENT

2.A Overview of Second Embodiment

An overview of the electronic transaction system 200 according to a second embodiment of the present invention is described with reference to FIG. 6. A subscriber 202 is issued one or more certificates 204 from a certification authority within an hierarchy of certification authorities 206 or from one of a number of sponsors 208. The certificates may serve to identify the subscriber 202 or to authorize certain transactions or types of transactions by the subscriber 202. Copies of the certificates (or of relevant information from the certificates) is placed in repositories or directories 210. Each certification authority and sponsor may have its own directory 210, or they may share directories 210.

The subscriber 202 transacts with a party 212 (hereinafter the relying party) by forming and digitally signing a transaction 214 which includes those of the subscriber's certificates (or unique identifiers of the subscriber's certificates) required to identify the subscriber and to validate and authorize the transaction and then sending the transaction 214 to the relying party 212.

Upon receipt of the signed transaction 214, the relying party 212 verifies as much of the transaction 214 that it can or that it wishes to, and then composes a message 216 which it then sends to a reliance manager 218. The message 216 can be one of various different kinds of messages, including either a signature guarantee request (SGR) message, a status check message (SCM), an over-limit guarantee (OLG) request and an unrely request message (URM) The OLG request will be made in the event of the rejection of a RCM. They permit the user optionally to request an increase in the subscriber's reliance limit.

Preferably a purpose field is included in each message 216 so that a reliance manager 218 knows which tasks to perform. An SGR informs a reliance manager 218 that the relying party 212 intends to rely on certain information included with the message (derived from the transaction 214), and asks the reliance manager 218 to verify that the information is reliable and to guarantee the results of the check. For example, an SGR may specify that a relying party 212 intends/wishes to rely on certain certificates for a $200 transaction, and the reliance manager 218 is requested to check that the transaction will be good for that amount.

A status check message is similar in form to an SGR, except that the relying party 212 does not actually request a guarantee, only an indication that such a guarantee would be given if requested.

Over-limit guarantee requests are essentially the same as the reliance requests of the first preferred embodiment. However, a relying party 212 can make an OLG request without there being anything in the certificates to the effect that such a request is required.

When the message 216 is an SGR or an SCM, it contains enough information for the reliance manager 218 to verify the subscriber information in the transaction 214. The relying party 212 may also specify in the message 216 a category of transaction as well as those aspects of the subscriber's information in the transaction 214 (or, more precisely, in the certificates associated with transaction 214) on which it intends to rely.

As noted, the relying party 212 can verify as much of the transaction 214 that it can or that it wishes to. Thus, for example, a relying party 212 may verify all signatures, certificates and attribute values within the transaction and then just request that the reliance manager 218 check the certificate serial numbers against CRLs. Alternatively, the relying party 212 may send the entire transaction 214 to the reliance manager 218 for verification, doing nothing itself. The cost of the verification services performed by the reliance manager 218 can depend on the amount of work it is requested to perform.

When the reliance manager 218 gets a message 216 from a relying party 212, it first determines what kind of message it has received. If the message is an SGR or SCM, the reliance manager 218 tries to verify the information in the certificates provided by the subscriber 202 to the relying party 212 in the transaction 214. To verify this information, the reliance manager may check with certification authorities 206 and sponsors 208, or it may rely on information (e.g., CRLs or information from previous checks) that it has previously obtained from those parties or from elsewhere, e.g., from directories 210.

The reliance manager 218 tracks the cumulative liability of each certification authority 206 and sponsor 208, and periodically notifies them of this liability. The regularity of this notification may depend on the arrangement between the reliance manager 218 and the parties, or it may depend on the type or size of the transaction or liability. For example, in some cases a certification authority may wish to be notified immediately of certain transactions or types of transactions, such as transactions exceeding a certain amount of money, transactions by particular entities, transactions which would cause its cumulative liability to exceed some value, transactions at certain times of day or any combination these and other conditions. In this way, a certification authority 206 or a sponsor 208 would be able to act immediately, if necessary, to insure for liability against those transactions.

There may be more than one reliance manager 218, and different transactions 212 or different parts of the same transaction 214 may have to be verified by different reliance managers. In order for the various reliance managers 216 to track the cumulative liability associated with each outstanding certificate, global liability tracking servers 220 are used. Each liability tracking server 220 acts as a global shared memory for the electronic transaction system 200, allowing cumulative liabilities associated with each outstanding certificate to be read and written by reliance managers 218. Only one liability tracking server 220 may be used for each certificate. The liability tracking servers 220 can be separate entities or they can be a part of the directories 210, the CAs 206, or the sponsors 208. If a particular certificate can only be processed by one reliance manager, then that reliance manager can track the cumulative liability associated with that certificate. These liability tracking servers provide a general "inhibit" function to detect and prevent over-reliance on a certificate. The "inhibit" service is generally performed by a high availability system under contract to the issuing CA.

Certificates can specify a reliance limit or a reliance limit per period of time, e.g., per hour, day, week, month, year, 24 hour period, weekday, etc. Thus, one certificate may have a reliance limit of $200 per day, while another has a reliance limit of $500. Similarly, certificates can specify a number of transactions per time period, e.g., per hour, day, week, month, year, 24 hour period, weekday etc. Thus a certificate may specify ten transactions per day. Combinations of these may apply, e.g., five transactions per day, not to exceed $500 per day. Beyond this, an OLG request would be required to be granted at the discretion of the reliance manger 218.

The liability trackers 220 store the current cumulative liability and the number of transactions for each certificate for the period stated in the certificate. The certificates can be indexed based on their unique identity (issuer name and certificate serial number).

Since a certificate may specify a class or category of reliance managers which can be used to validate that certificate, simultaneous attempts to read/write values for a particular certificate at a liability tracker 220 are possible. That is, it is possible that more than one reliance manager 218 is processing a copy of the same certificate and that more than one reliance manager is requesting reliance based on that certificate. Accordingly, the liability trackers 220 use an appropriate locking mechanism to ensure consistent reading and updating of their records.

Each reliance manager 218, certification authority 206 and sponsor 208 may, at any time, insure itself against some liability by obtaining insurance from an insurer 222. The reliance manager 218 may be authorized to obtain insurance from insurers 222 on behalf of a certification authority 206 or sponsor 208, depending on such factors as that authority or sponsor's current pending cumulative liability. The reliance manager 218 may also obtain its own insurance from the insurers 222.

The reliance manager 218 bills the various parties for its services via billing service 224. The reliance manager 218 also bills the appropriate party for the use of the certificates being relied upon by the relying party 212. This may take the form of requiring an immediate electronic payment, e.g., from an unknown relying party, debiting a pre-established deposit account, e.g., of a sponsor, or sending a periodic invoice to a sponsor or relying party with established credit and payment history.

Having processed a message 216 (e.g., verified an SGR or SCM, or processed an OLG request), notified the appropriate parties, obtained the appropriate insurance and billed for the services provided, the reliance manager 218 then sends a reliance manager receipt (RMR) 226 to the relying party 212. This RMR 226 informs the relying party 212 of the outcome of the status checks and of the amounts charged for those checks, or, in the case of an over-limit guarantee request, of the response to that request which may be either a guarantee receipt or a reject message. The RMR receipt 226 can be digitally signed by the reliance manager 218, with the date and time and a digest of the message, thereby acting as proof of the verification performed by the reliance manager. The reliance manager 218 can, if needed, archive the message 216, the signed receipt 226 and any other information related to the processing of that message 216.

The transaction 214, the message 216 and the RMR 226 can be digitally signed by an independent timestamp server 228 when created.

Upon receipt of the RMR 226, the relying party 212 can store the RMR and, depending on the information in the RMR 226, continue the transaction with the subscriber 202.

Figure 6:
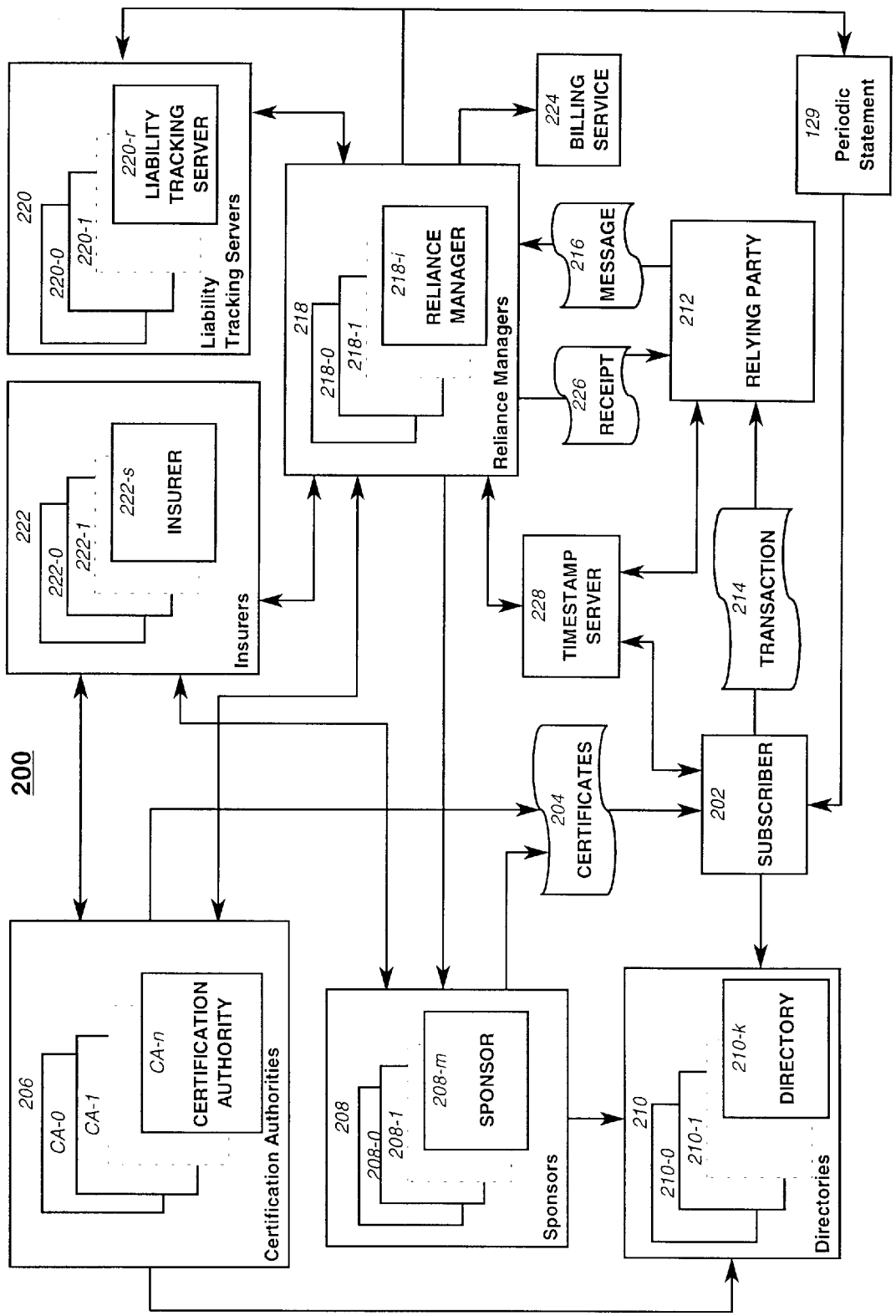
FIG. 6 shows an overview of an electronic transaction system according to second embodiment of the present invention.

While shown in FIG. 6 as separate entities, the billing service 224 and the reliance manager 218 can be part of the same entity, in which case the various parties to a transaction (e.g., certification authorities, sponsors, subscribers and vendors) can have accounts with the reliance manager 218. The reliance manager will keep separate totals for status check fees owed to itself and reliance fees owed to CAs, sponsors and insurers, and will periodically perform a separation and settlement of all these charges, collecting any funds due and remitting all funds collected to the appropriate parties, less any service fees.

On a periodic basis, upon request of the subscriber, the reliance manager, or the global liability tracking ("inhibit")

service, if one is being used, will send to the subscriber a statement listing all signatures of that subscriber that have been presented to the reliance manager, including the identity of the relying party, the reliance limit requested (if any) and the fees charged. This statement may be delivered via conventional paper-based mail, electronic mail, or may be browsable via a Web server by the subscriber at any time. The statement's purpose is to remind the subscriber of the signatures it has issued, and to allow it to possibly identify any signatures that may have been falsely issued or improperly relied on.

Further, while shown in FIG. 6 as separate entities, the subscriber 202 may, in some circumstances, itself be the relying party 212. For example, a subscriber 202 may wish to determine whether a particular transaction would be acceptable for a signature guarantee before sending that transaction to another party.

2.B Detailed Description of Second Embodiment

The process of a certification authority CA-n issuing a certificate 204 to a subscriber 202 is now described with reference to FIG. 6. The subscriber's certificate 204 is stored in some preferably secure location, e.g., in the subscriber's trusted secure device 230 (see FIG. 7) which can be a smart card or the like.

Figure 12:
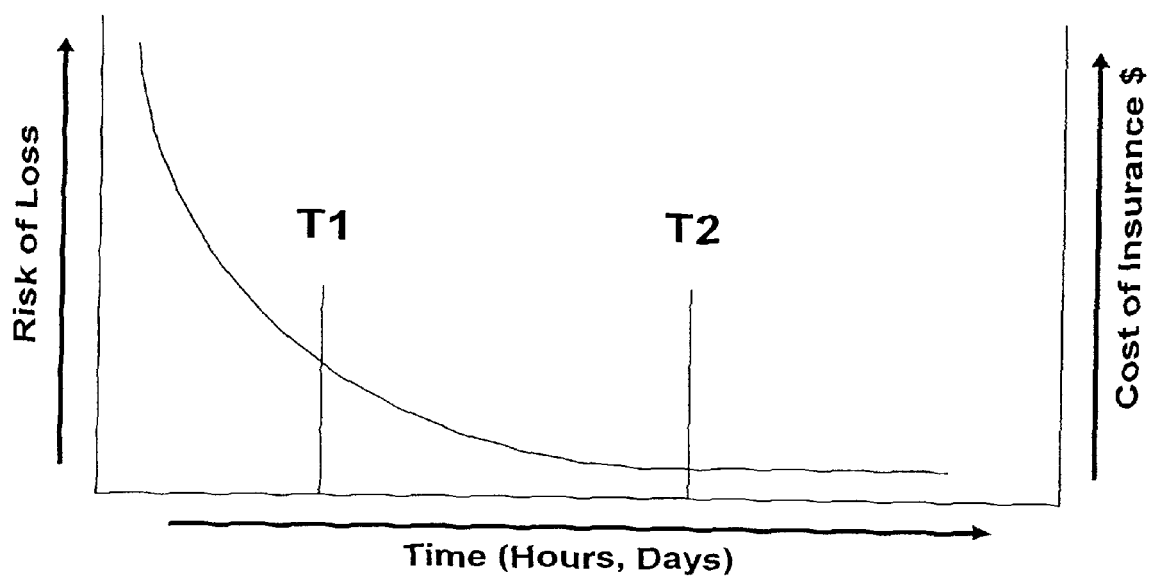
FIG. 12 illustrates various risk, time, and cost considerations.

The subscriber's certificate 204 has an X.509 form (as shown in FIG. 12) and includes the following information or attributes:

1. The name of the issuer of the certificate.
2. A unique certificate serial number (note that the combination of the certification authority name and the certificate serial number uniquely identifies a certificate).
3. The subscriber's public key.
4. The reliance limit set by the issuer, e.g., a maximum dollar amount transaction and/or per time period (day, week, month, year, etc.).
5. Whether the status of the certificate must be checked before the issuer will assume any liability for reliance on information in the certificate.
6. The name and optionally a network address of at least one status checking service (reliance manager 218) approved by the issuer at which this certificate can be checked as well as a suitable address for its directory 210. If an X.500 directory lookup system is used, then the name and address will be the same, otherwise, it may be necessary to specify a valid network address and means of communication.
7. The checking service's status checking fee.
8. The guarantee fee (per dollar amount of reliance).
9. Who will pay the status check fees (subscriber, certification authority or sponsor).
10. Whether the subject/subscriber of this certificate is a device.
11. Whether signer/device numbers its signatures, and, if so, whether the numbering is (a) sequential or (b) pseudo-random.

The certificate 204 may also include an optional field granting permission for the status check service to bill some or all of its fees to either the sender/signer or another third party (typically the signer's employer or sponsor) instead of requiring the relying party to pay them. When this feature is used, the status service keeps a record of the signature number or of the signature value (or some value derived therefrom) to prevent the same or different relying party from utilizing the third party billing feature more than once.

Thus, the status service will detect that a specific digital signature has been checked and insured before, and will reject any attempt to re-check it at the sponsor's expense, which could incur unreasonable charges.

In some cases, and when authorized, the certificate 204 will also include the name and account number of a third party who has agreed to cover the status check and guarantee fees.

Alternatively, the certificate 204 may not be an identity certificate which links a subscriber name to a public key, but rather one which confers some privilege or authority on the subscriber (i.e., an authorization certificate as described in U.S. application Ser. No. 08/277,438 to Sudia, filed Jul. 19, 1994, titled "Method for Securely Using Digital Signatures in a Commercial Cryptographic System," the contents of which are hereby fully incorporated herein by reference), in conjunction with an identity certificate. Such an authorization certificate may also have an associated system of transaction limits which requires administration by a reliance manager, and accordingly will have added to it the same or a similar set of "reliance specification" fields described above.

When the certification authority CA-n (or a sponsor) issues a certificate 204, a copy of relevant information from that certificate is sent to an appropriate repository or directory 210. The information sent to the directory 210 includes the certification authority name, the serial number of the certificate and, in the case of an identification certificate, the public key of the subscriber. The certificate information is also sent to a status checking service (RM). Generally this RM will be the same as that specified in the certificate.

In an hierarchical certification system, each certification authority will itself be certified by another CA, with one of the CAs being certified by the root certification authority CA-0. Each certification authority publishes appropriate information about the certificates it issues in some directory 210. The certification authorities can use the same or different directories 210.

A CA's certificate (from its parent) contains similar attributes to those listed above for the subscriber certificate 204. The CA's certificate also contains an attribute specifying whether the parental limits apply only to the subscriber or whether they apply to the aggregate daily volume of all subscribers of a named certification authority.

Figure 7:
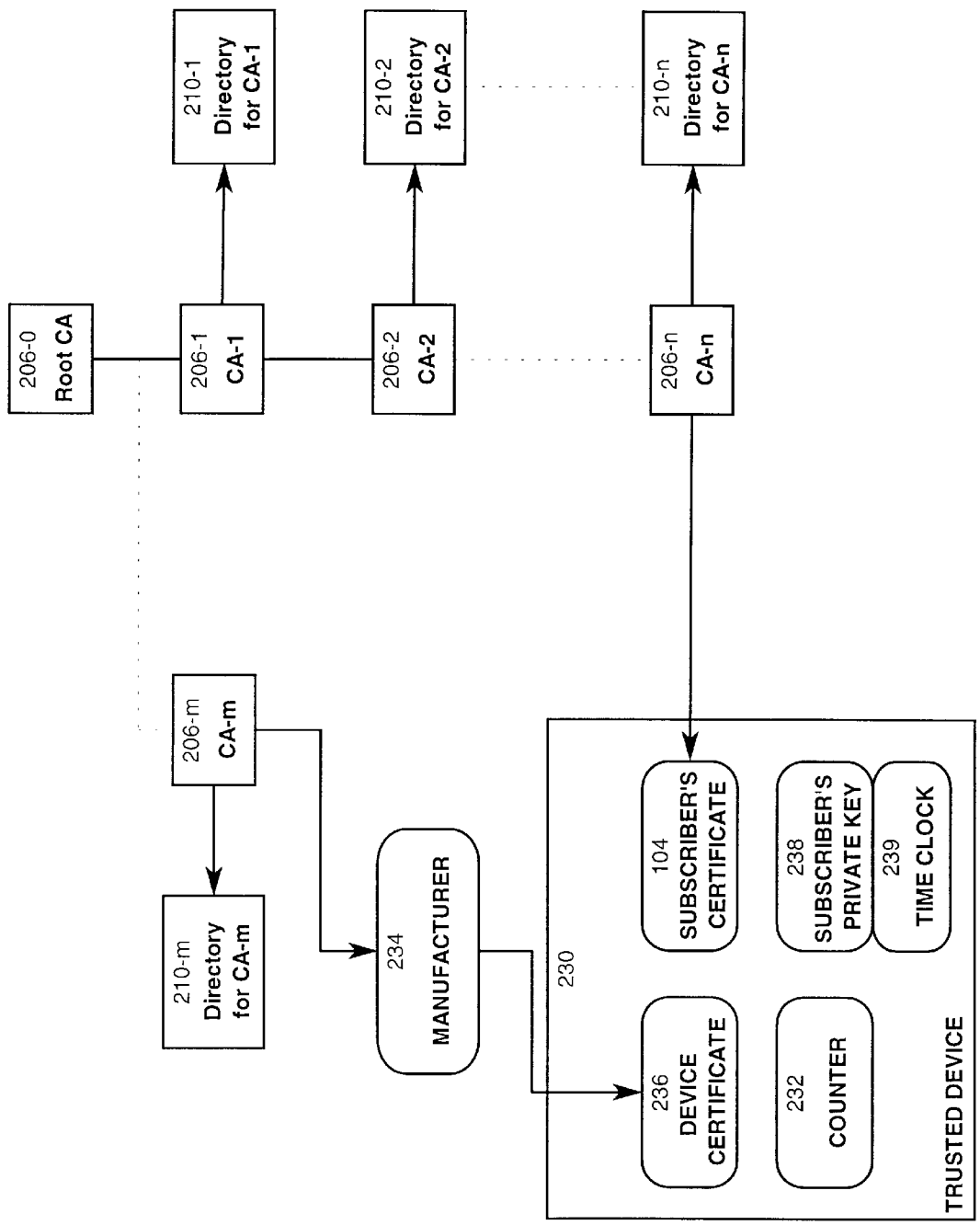
FIG. 7 depicts the issuance of certificates to a user of the system of FIG. 6.
Figure 8:
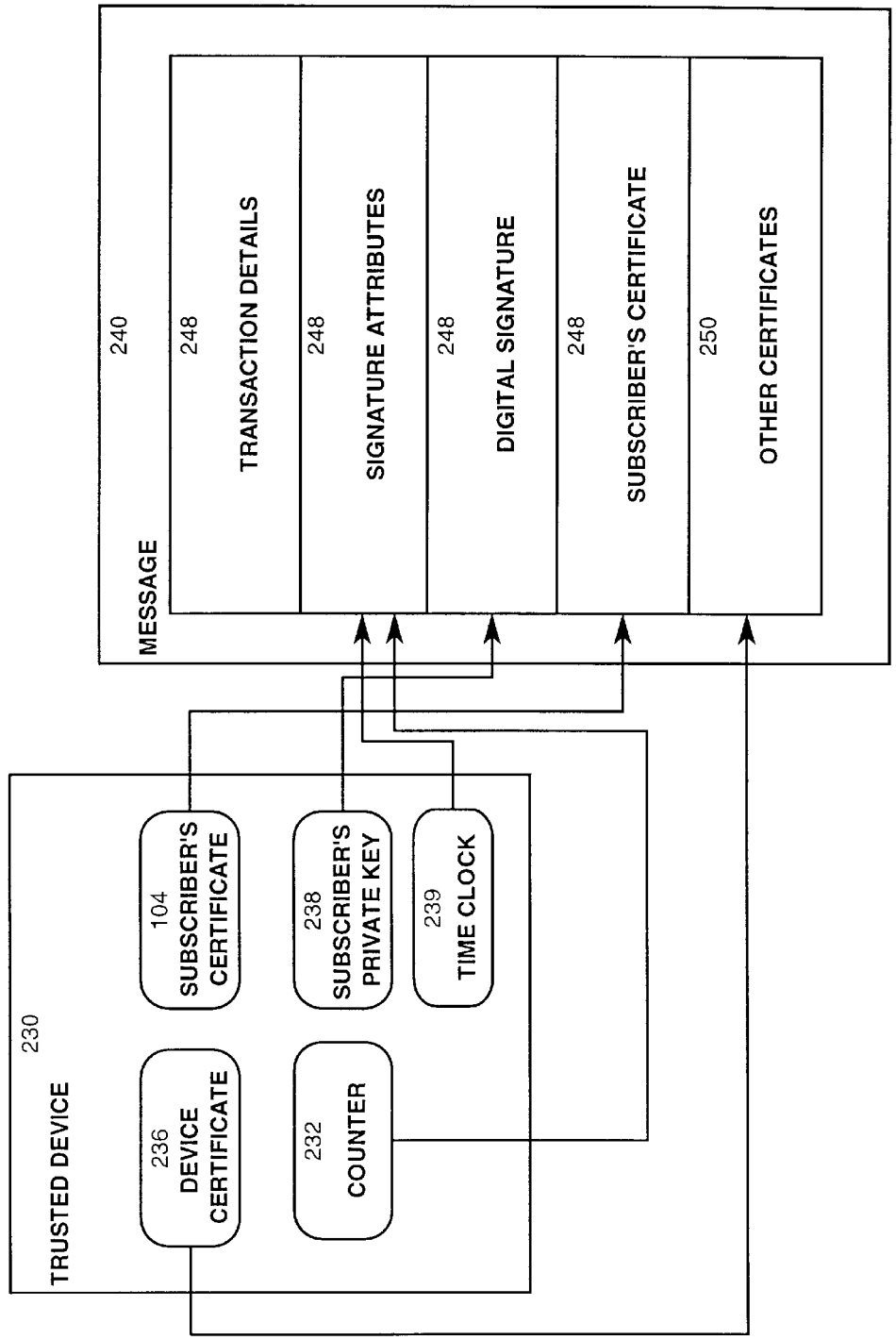
FIG. 8 depicts a user's generation of a digitally signed transaction according to the present invention.

With reference to FIG. 7, a trusted device 230 according to preferred embodiments of the present invention includes a tamper resistant numerical counter 232. This counter increases monotonically by some value, e.g., one, each time the device is used to create a digital signature. Further, the current value of the counter is embedded as a signature attribute value in each signature block signed by the device 230.

By sequentially numbering each signature of a device (or of a user), and then collecting each of these numbers when the signatures are submitted to a reliance manager, possible tampering and counterfeiting of devices or theft and unauthorized use of private signature keys can be detected. If a private signature key is extracted from a device, it may be used to sign transactions that look, when accompanied by the manufacturer's device certificate, as if generated in a trusted manner by that device. However, when used outside the device, they may be used to create improperly formed transactions.

The signature numbering method described herein cannot detect mere use outside a device, but it can help to detect counterfeiting or reproduction of false devices using a legitimate device signature key and certificate obtained by removing a tamper resistant coating, or the like. We assume that the goal of counterfeiting is to produce and sell a significant number of devices based on tampering with a few legitimate devices—since the cost of successful tampering will be fairly high. Thus, by requiring a sequential number with each signature, we allow for the possibility detection by a centralized system that collects and compares these numbers. If duplicates occur, or if numbers are received far out of sequence (due to thieves setting each counter to a different base value) then the system can detect, investigate and possibly revoke the affected device certificate.

This scheme is strengthened if the trusted device also contains a reliable time clock that can place a time value into each signature along with the counter value. This can allow the reliance manager to sort the incoming transacting signatures by their creation dates, thus making it much easier to spot signature numbers that are out of sequence.

As a further variation, we can generate the signature numbers (a) by using a pseudo-random number generator (PRNG) with a seed known to the CA and the reliance manager so they may compute the expected sequence of numbers, or (b) by starting with a base value and then adding an increment that are both a function of the specific device manufacturer.

For example, both the initial starting value of the counter 232 and its increment per transaction can be randomly set by the device manufacturer 234 when the device is certified, and then these values can be incorporated, along with other information, into the device certificate 236 in the device 230.

Each device manufacturer 234 may be assigned a different counting factor, preferably a prime number greater than one, and the increment for the counter 232 can be set, at the time of manufacture, to be a random value multiplied by this factor. Thus, for example, if there are three manufacturers of secure cryptographic devices 230, namely M1, M2 and M3, then M1 would be assigned the factor 3, M2 the factor 5, and M3 the factor 7. Then, for each device that manufacturer M1 manufactures, it generates a random number, R, and sets the increment for the counter 232 to be "3×R". Similarly, manufacturer M2 would set the increments of counters in its devices to be 5 times a random number, and manufacturer M3 would set its increments to be 7 times a random number. The range of the random numbers used to determine the increments can be limited, for example, from 1 to 200, and can also exclude prime numbers. The initial starting value may also be determined using this factor.

Instead of storing the increment itself, the device certificate 236 issued by the manufacturer need only store the random value R used to determine the increment or the seed of the random number generator used to determine R (as long as the random number generation algorithm is known).

The device 230 contains a copy of the subscriber's private key 238 (corresponding to the public key stored in the subscriber's certificate 204 and in the directory 210).

The device manufacturer 234 is itself certified by a certification authority CA-m in the certification authority hierarchy under the root certification authority, CA-0. Thus, the device certificate 236 in trusted device 230 can be verified using the manufacturer's public key (stored in the directory 210-m for certification authority CA-m).

With reference to FIGS. 1–8, when a subscriber 202 creates a transaction 214, the subscriber generates a message 240 containing the transaction details 242, a copy 244 of the subscriber's certificate 204 (issued by the certification authority CA-n) and copies 246 of other relevant certificates. Instead of copies of the actual certificates, the subscriber 202 may include unique identifiers e.g., (issuer name and certificate serial number) for some or all certificates. The subscriber 202 then digitally signs a combination of the transaction 242 with various signature attributes 248 using his private key 238 to produce a digital signature 250.

If the subscriber's trusted device contains a signature counter 232 and time clock 239 as described above, then the other certificates 244 may include information such as copies of the device certificate 236 (so that the starting value and increment of the counter can be determined) and the signature attributes 248 must include the current value of the counter 232. If the device increments by one each time, no device certificate is needed. The copy of the device certificate, if needed, is used later to check for anomalous values of the counter 232 stored in the signature attributes 248. Typically the device certificate will have been submitted to the CA at the time the user's key was certified, and so its contents will already be known to the CA and to any RM or global inhibit service that it contracts with.

Anomalous values of the counter include values that are far out of sequence, values that have been previously seen on different transactions values that do not correspond to those which could be issued by that manufacturer, and values which do not correspond to those which could be issued by that device used on the information in the device certificate 236). If transactions are time stamped (e.g., contains a time value from an internal time clock 239), then even if transactions are submitted out of sequence, it is possible to determine whether or not a counter value is legitimately out of sequence.

Preferably the subscriber's private key 238 is stored in the subscriber's trusted device 230, as is the subscriber's certificate 204, however, either or both of these can be stored on a secure computer or some other secure storage device.

The digital signature 250 can be produced in any accepted and known manner. For example, the signature can be formed using RSA or DSA. The digital signature 250 and signature attributes 248 can include a PKCS-7 signature block which contains hashes of the attached certificates 244 and 246, an indication as to whether or not the signer is a device, a signature number unique to this private key (the counter 232 value) and preferably an associated time-stamp (from internal time clock 239) indicating when the signature was made. In the case of a secure device 230 with a counter 232, the signature number is the current value of that counter.

2.B.1 Relying Party Receives Transaction

When a relying party 212 receives a transaction 214 formed as described above, it can do a number of things, depending on how much information is contained in the transaction 214 and on how much it wants the reliance manager 218 to do.

Figure 9:
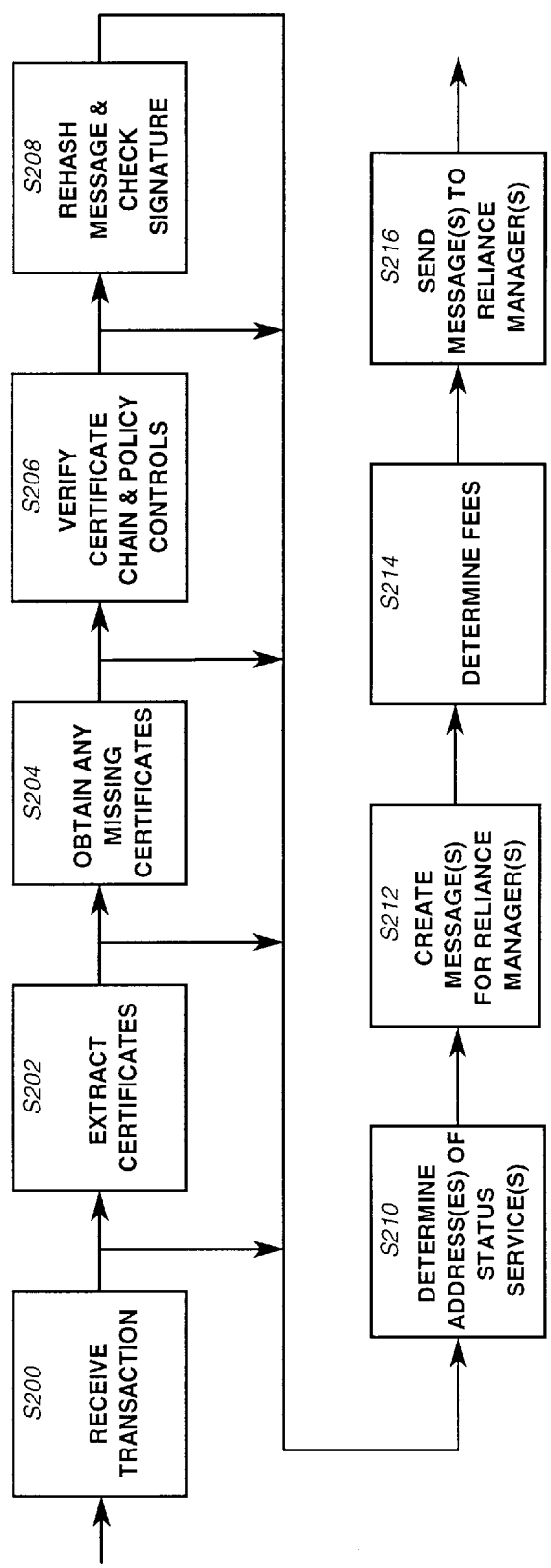

With reference to FIG. 9, the relying party 212 receives the transaction 214 (step S200) and performs some or all of the following steps:

If the relying party 212 wants the entire transaction 214 checked by a reliance manager 218, it proceeds by determining the address(es) of the appropriate reliance manager (s) 218 to which the entire transaction 214 will be sent (step S210).

Otherwise, the relying party 212 extracts the copy of the subscriber's certificate 242 and the other certificates 244 (if any) from the transaction 214 (step S202). Recall that some or all of these certificates 242, 244 may not be present. They may have been sent previously, be obtainable from directories, or be left for the reliance manager to obtain. The transaction 214 should contain at least a unique identifying reference (e.g., issuer name and serial number) to the subscriber's certificate 204.

At this point the relying party 212 can either further validate the transaction 214 itself, or it can go directly to the address determination step (S210), letting the reliance manager 218 check the entire transaction 214.

If the relying party 212 decides to further verify the transaction 214, it then retrieves any missing certificates (step S204). The missing certificates are obtained from the appropriate directory 210 or the relying party 212 may have retained copies of them from prior retrievals. This certificate retrieval process is done by working upward from each provided certificate to find all parent certificates, working toward a known good root key.

Figure 2:
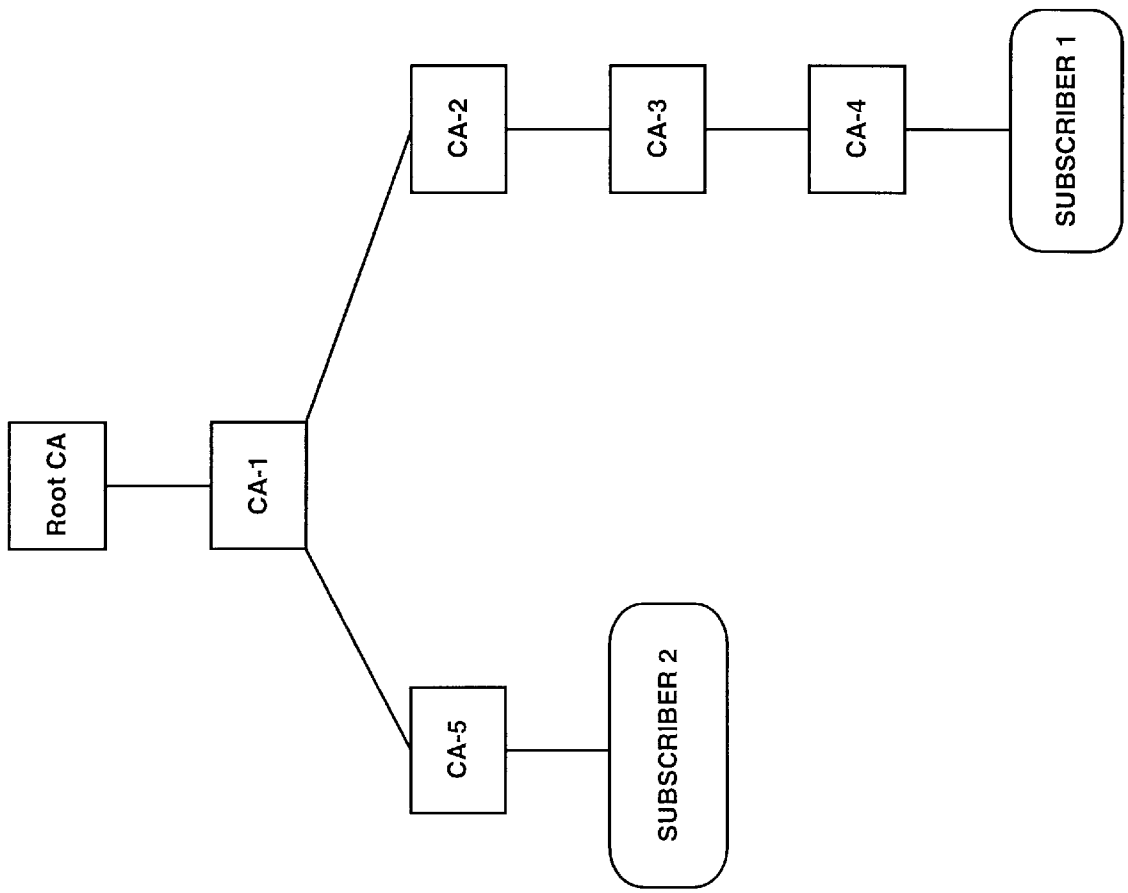
FIG. 2 shows a typical certification hierarchy.

Thus, for example, if the transaction 214 was signed by the subscriber2 of FIG. 2, and the transaction contained only subscriber2's certificate, then the relying party 212 would have to obtain the certificate issuer's certificate (i.e., CA-5's certificate), and then CA-1's certificate. On the other hand, if the transaction was signed by subscriber1 of FIG. 2, and the transaction contained certificates for subscriber1, CA-1, CA-2, CA-3 and CA-4, then the relying party 212 would not have to obtain any more certificates in order to verify subscriber's signature.

Again, at this point, the relying party 212 can continue to verify the transaction 214 itself, or it can go directly to the address determination step (S210), giving the reliance manager 218 more of the transaction 214 to check.

Having obtained all the required certificates (in steps S202, S204), the recipient verifies the certificate chain (step S206), working downward from the root to the signer, verifying policy controls in the certificates on the way down. The relying party 212 then re-hashes the message and checks the signature against the base signer's certificate (step S208).

2.B.2 Relying Party Determines Address(es) of Status Service(s)

Before having any aspect of a transaction 214 verified by one or more reliance managers 218, the relying party 212 must determine which reliance manager(s) to use. Each subscriber certificate includes either the name of a status checking service (reliance manager 218) at which that certificate can be checked as well as a suitable address for its directory 210, or the relying party 212 must obtain that information from the appropriate certifying authority 206. Thus, given a certificate, it is possible to determine which reliance manager to use to verify aspects of that certificate.

Accordingly, in step S210, if the relying party 212 has not already obtained at least one appropriate certificate (in step S202), it does so and determines from that certificate the name of a reliance manager 218 (or a class of reliance managers) at which that certificate can be checked.

On the other hand, if the relying party had already obtained at least one certificate (in step S202), it uses that certificate to determine the name of a reliance manager 218 (or a class of reliance managers) at which that certificate can be checked.

If the relying party obtained all certificates associated with the transaction, it determines the appropriate reliance manager 218 for each certificate.

2.B.3 Relying Party Creates A Message

Having received a transaction 214 (step S200), and verified as much of that transaction as it desires (steps S202–S208), the relying party 212 next creates one or more messages (either SGR, an SCM or an OLG request) 216 (step S212) to be sent to one or more reliance managers 218.

However, before creating any messages 216 (step S212), the relying party 212 must determine which reliance manager(s) 218 to send the message(s) 216 to. Since there might be more than one message 216 if multiple reliance managers are involved, the relying party 212 must first determine how many reliance managers are involved.

When a certification authority 206 or sponsor 208 issues a certificate, it specifies, in the certificate, a status checking service (reliance manager 218) at which this certificate can be checked. The status checking service can be specified by name, class of provider or in some other manner. Thus, a certificate issuer may determine that only a particular reliance manager 218 can verify its certificates (and so specify in its certificates), or it may allow its certificates to be verified by any reliance manager 218 that meets certain requirements (as specified by a reliance manager class).

The relying party 212 next analyzes the certificates requiring status checking in order to determine the address(es) of status services (reliance manager(s) 218) to use for transaction verification (step S210).

The contents of the message(s) depend on what it is the relying party 212 wants the reliance manager(s) 218 to do. First, the relying party 212 may provide the reliance managers(s) 218 with the entire transaction 214 or with only parts of the transaction. Second, the relying party 212 may provide the reliance manager(s) 218 with all certificates associated with the transaction or it may provide only unique identifiers for only some of the certificates. Third, the relying party 212 may ask the reliance manager(s) 218 to validate the entire transaction or only some aspects thereof.

The various functions that the relying party 212 can request of the reliance manager(s) 218 include:

(1) Given only the unique identifiers of certificates, check whether or not those certificates have been revoked (i.e., are listed on CRLs) or suspended.

(2) Given a set of actual certificates, check whether or not they have been revoked or suspended.

(3) Given a combination of certificates and unique certificate identifiers, check whether or not those certificates have been revoked or suspended.

(4) Verify certificate chain to see if certificates actually verify each other. Note that the RM can store most certificates in a pre-verified state to avoid the need to perform digital signature computations repeatedly.

(5) Same as above in (1)–(4), but check entire transaction, including the digital signature of the original subscriber who signed it.

As noted above, the message 216 can be one of various different kinds of messages, including either an SGR (which informs a reliance manager 218 that the relying party 212 intends to rely on certain information included with the message and asks the reliance manager 218 to verify that the information is reliable); an SCM (which is similar in form to an SGR, except that the relying party 212 does not actually request a guarantee, only an indication that such a guarantee would be given if requested) or an OLG request.

If the message 216 is an SGR or an SCM, it includes a monetary to value (for reliance purposes) which the relying party 212 initially determines from the transaction 214. If no monetary value is provided in the transaction 214 or if the relying party wants to rely on a different value than that provided (for example, if the relying party 212 self insures for some amount), the relying party can set the monetary value in the message 216 accordingly. However, to prevent the relying party 212 from stating a monetary value in excess of the value stated in the transaction 214, thereby perhaps prematurely exhausting the subscriber's maximum allowed limits, the transaction's signature attributes 248 should include the actual stated value of the transaction, and the message 216 should include this actual stated value by including the signature attributes 248.

If only a status check is desired, either a status check bit can be set in the message or the monetary value in the message 216 is set to zero. Preferably a status check bit is used to avoid overloading of data values with semantics. In this case the message 216 (an SCM) will be used to request confirmation of the status of the various certificates, but will not be used to purchase any guarantees.

A message 216 (SGR or SCM) contains the following (not necessarily in the given order):

1. The name and network address of the relying party 212.
2. A unique sequence number so duplicate messages (RCMs in particular) can be rejected.
3. Account information with the billing service 224 for billing purposes (even if the signer or sponsors pay).
4. An optional intent to request extension if over the allowed/remaining reliance limit.
5. A list of certificates or certificate unique identifiers (e.g., issuer names and serial numbers).
6. A signature sequence number and timestamp (if present in the transaction 214).
7. A hash of the message (transaction 214) being checked. Optionally the entire message can be appended for checking and/or archiving.
8. A date and time of request can be (provided by timestamp server 228).
9. An optional list of categories for this transaction.
10. A request to archive even if status check fails; or to archive even if over reliance limit.
11. An archive retrieval password, encrypted with reliance manager service's public key.
12. A purpose for this message (guarantee request, status check billing approval, etc.).
13. A role (relying party)
14. A hash of the relying party's billing service certificate.
15. The relying party's signature for charging the account at the billing service 222.

2.B.4 Relying Party Sends Message(s)

Having determined the address(es) (step S210) and created the appropriate message(s) (step S212), the relying party 212 then determines the total of base checking fees requested and the total of reliance guarantee fees requested per dollar amount of reliance value (step S214).

With the messages 216 created, they are sent (step S216) to the appropriate reliance manager(s) 216. The messages 216 are sent using whatever transport mechanism is specified in directory entry for the reliance manager, e.g., sockets, HTTP, e-mail, and the like.

2.B.5 Processing by Reliance Manager

1. Receive Message

Upon receipt of a message 216 from a relying party 212 (step S218), the reliance manager 218 performs the following operations (with reference to FIG. 10).

2. Verify Message Syntax

First the reliance manager 218 verifies (step S220) that the general syntax of the message 216 is correct. If the syntax is incorrect, the reliance manager 218 notifies the relying party 212 and ceases processing. A relying party 212 may be billed for a syntactically incorrect message.

If the syntax of the message 216 is correct, then, if the relying party 212 has an account with the reliance manager 218 (i.e., if the reliance manager and the billing service 224) are the same entity, the reliance manager looks up the relying party 212 public key which it has stored locally, hashes the message 216 and verifies the relying party's signature.

If the relying party 212 does not have a pre-established account with the reliance manager 218, the reliance manager must verify the relying party's signature on the message 216 by some conventional approach, typically verifying the chain of certificates which specify the relying party's public key.

3. Determine Minimum Fees

Next, the reliance manager 218 determines the minimum amount due on this verification transaction and verifies available funds in the relying party's account (step S222). Sometimes the reliance manager 218 cannot determine the full amount due on a transaction until the entire transaction has been verified. If the reliance manager 218 and the billing service 222 are separate entities, then the reliance manager can either bill the relying party's account with the billing service or contact the billing service to determine whether the relying party is in good standing with them and has funds or credit available.

4. Determine What is being Requested

Subsequent activities of the reliance manager 218 depend on what the relying party 212 requested in the message 216. The reliance manager 218 determines what it is that is being requested (step S224) and validates the message accordingly (step S226).

5. Validate Message

In one possible case, the reliance manager 218 is given (in the message 216) the unique identifiers of various certificates and/or actual certificates, along with a requested reliance limit. The reliance manager 216 checks whether or not those certificates have been revoked (i.e., whether or not they are listed on CRLs) or suspended.

The reliance manager 218 must first check to determine whether the requested reliance is less than or equal to the value of the transaction 214. The signature attributes block 248 of the transaction includes the value of the transaction, and this block, along with the actual signature, are provided to the reliance manager along with the relying party's requested liability. If the requested reliance exceeds the value of the transaction, the reliance manager should reject the request. In such cases, the reliance manager should notify the subscriber 202 and other parties of the request.

The reliance manager can thus verify the signature and from the block can extract the subscriber's declared transaction value prior to utilizing the subscriber's available reliance limit. If the entire transaction has been submitted, the RM can also hash it to see if it matches the transaction hash contained in the signature attributes block. These processes of checking the signature block or the entire message can generally be omitted for smaller value message, where it is appropriate to rely on the declared values provided by the relying party. In such cases, the signature guarantee or other transaction insurance provided by the reliance manager will simply be void if there is any misstatement by the relying party, so it is not in his interest to submit incorrect values.

For each certificate listed in the message (either by serial number or by being provided), the reliance manager 218 checks that certificate's serial number against the appropriate CRL, i.e., the CRL from the issuer of that certificate. If the certificate has been revoked or suspended, the reliance manager notes the invalidity of that certificate and continues with any remaining certificates. If any certificate is invalid the entire transaction is considered invalid.

For each certificate checked, the reliance manager 218 can notify the issuer of its use and of the reliance value being associated with that certificate (step S228). Such notification can be monthly, daily, weekly, hourly, or per transaction above a pre-approved amount.

6. Update Global Reliance Limits

The reliance manager 218 can also read the current cumulative liability for that certificate from the appropriate global liability tracker 220 assuming more than one RM can validate. If the current cumulative liability exceeds the requested liability, the transaction is invalid and is rejected. The reliance manager notifies the relying party if it will consider processing an over-limit guarantee request. Otherwise, if the current cumulative liability in addition to the requested liability does not exceed the limit on that certificate, the cumulative liability should be updated to reflect the requested amount (step S230).

Because of potential synchronous update attempts of the cumulative liability, the reliance manager may need to obtain a lock on the values for all certificates used by the transaction with the corresponding liability trackers before doing any reading or updating of values. Alternatively, it can use an optimistic commit strategy, write new values as each certificate is processed, and roll back any change in the event of a later failure (over limit). The updating of these records can be performed in any manner known in the art. Further, in some cases, only a few of the certificates have their associated liability checked. The last one (of the subscriber 202) is the most important one to monitor closely.

In some cases the reliance manager 218 will be asked to check an entire transaction. In these cases the reliance manager will obtain all the certificates associated with the transaction, check them for validity and consistency and then process them as above with respect to the liability limits requested.

Once the reliance manager 218 has determined the status of a particular certificate, the reliance manager 218 can create a record for that certificate. This record can be created regardless of the certificate's status. The record lists all certificates on which this certificate depends and all certificate which depend on this certificate. In this way, chains of certificates can be verified in a single table lookup. Whenever a CRL is received or whenever the reliance manager determines that a particular certificate has become invalid (revoked or suspended) it can update its records, invalidating chains as appropriate.

The reliance manager also records all parties who have relied on each certificate. Whenever a CRL is processed or whenever the reliance manager determines that a particular certificate is invalid, the reliance manager can inform all parties who have relied on that certificate within a certain period of time, such as 1–2 weeks. This is sometimes referred to a "lookback notification," and it can help parties who recently relied on a certificate prior to its revocation determine if there may be any problems with prior transactions, e.g., possible fraudulent transactions issued by a thief prior to discovery of the theft of the signer's key, and reporting to the CA for certificate revocation.

If all certificates associated with a message are acceptable, then the reliance limit for the appropriate period on each certificate is incremented according to the reliance requested in the SGR.

7. Determine Fees and Bill Parties

The reliance manager 218 then writes the transaction for later batch processing, during which it increments guarantee fees collected on each certificate and accumulates guarantee fees by issuing certification authority name (step S232).

If any certificate is not acceptable then the relying party 212 (or the subscriber 202) is billed only for the base checking fee, and the reliance and guarantee fees do not apply.

8. Archive Message if Requested

If the message 216 requests an archive and the full document is attached then the document is rehashed and the signature as submitted is verified. If the result of this is not the same as the transaction submitted then the archive request is rejected, otherwise the message is archived (step S234.)

The relying party 212 is then billed for the initial archive period requested, the default period being six months. The relying party 212 is notified that he will be billed for successive archive periods. The receipt provided by the reliance manager contains a transcript, a hash of the transaction, and is signed using a long "archival" signature key (of at least 1800 bits) so the user can archive the transaction anywhere. It is, however, convenient to let the RM validate store the transaction as a "one-step shopping" arrangement.

9. Verify Signing Device

If the signer of the transaction 214 was a device (or device-confined subscriber private key), then the reliance manager 218 checks for anomalies based on the history of signatures produced by this device (verify device, step S236). The reliance manager saves the transaction record with the issuer name, certificate number, signature sequence number, and the date and time of receipt of the message 216.

After some period, the reliance manager 218 sorts these transactions and checks for anomalies in sequence number and date-time values of past transactions. If the device has manufacturer specific starting values and increments, the sequence numbers are checked to determine whether they follow the correct sequence.

If an out of sequence value is found, (such as a counter value that is repeated for different transactions, out of order with respect to the associated timestamp, or with a large unexplained gap since the preceding value) the certificates for that device and that subscriber should be revoked immediately. Therefore, the issuing certification authorities are notified so that they can add the user and device certificates to the appropriate CRL. The reliance manager 218 may also notify device owner/subscriber, if known, as well as the issuing certification authority or sponsor, the device manufacturer, and possibly law enforcement authorities.

The liability tracking servers 220 can be used by the reliance managers 218 to read and write current values of device signature numbers. Each device certificate 236 or each subscriber certificate 204 can have a corresponding entry at a liability tracker 220. A reliance manager can update the global signature number entry each time it processes a signature. In this way duplicate or fraudulent signatures are more quickly detected.

10. Obtain Insurance

In some instances the reliance manager 218 may obtain insurance (step S238), either to cover its own assumed risks in validating a transaction or on behalf of a certification authority or sponsor. Typically, the reliance manager will be an authorized agent of one or more insurance companies that is authorized to write small signature guarantee policies on their behalf, subject to pre-established terms and conditions and premium rates. The RMR (receipt) will list the reliance amount, the fee paid, and may optionally list the name of the insurance company underwriting the signature guarantee.

11. The Reliance Manager's Response to the Relying Party

Having verified the message 216 (to the extent requested by the relying party 212), and having billed and notified the appropriate parties, issued or purchased the appropriate insurance and stored the required records, the reliance manager 218 then creates and sends a reliance manager response (RMR) 226 which it digitally signs and sends back to the relying party 212 via same method as the message 216 was sent, e.g., sockets, HTTP, e-mail, etc. (step S240). The receipt 226 can be timestamped by timestamp server 228 prior to being sent to the relying party 212. It is preferred that the timestamp server be a different physical and legal entity, so that if one or the other (reliance manager or timestamp service) is compromised, it will at least be impossible to backdate seemingly valid transactions.

The receipt 226 includes the following information:
1. The identity of the reliance manager 218.
2. A unique identifier (sequence number) for this receipt.
3. The identity of the relying party 212 (and optionally its address).
4. The relying party's unique message sequence number.
5. A hash of the message checked.
6. The date and time processed (declared value).
7. The results of the request, including:
    whether the certificate status checks were acceptable
    whether the amount was within requested reliance limits, and
    whether the message was archived, and, if so, an archive retrieval identification number
8. If any status checks failed, a list of status/reason codes by certificate.
9. The relying party's requested reliance limit (might be zero).
10. If the signer (subscriber 202) is over her limits, whether the service (reliance manager 218) supports over-limit exception processing.
11. If over-limit process was requested by relying party, what method is used for this.
12. If the status checks and reliance limit were acceptable, a list of fees paid by certificate checked and total fees billed to subscriber and/or third parties, and the total fees billed to relying party's account.
13. Whether the message had been previously checked and whether the subscriber/sponsors were out of funds.
14. A signature of the status check service 218.
15. A signature and time of timestamp server 228.

2.B.6 Status Check Fee Considerations

There may be a base fee per certificate check requested, even if the check falls. In some cases, there may be a higher fee if the certificate is acceptable, even with zero reliance.

2.B.7 Over-Limit Guarantee (OLG) Request

If a relying party 212 requests an over-limit guarantee, that party sends (as message 216) an over-limit guarantee (OLG) request to the reliance manager 218. The OLG request is used to request a guarantee over the reliance limit stated in the certificates associated with the transaction 214.

The OLG request includes the requester's name and network address, a unique identifier (sequence number) for this OLG request, a billing service account number for billing purposes, a list of certificate issuer names and serial numbers, for this status checking service:
1) signature sequence number (if present);
2) hash of the message being checked;
3) quoted cost of over-limit guarantee fee;
4) date and time of request; and
5) verifier's signature for charging the deposit or billing account.

The reliance manager 218 responds to an OLG request message with a similar response to the RMR response, except that the reliance manager 218 approves and guarantees the relying party's requested over-limit reliance amount.

2.B.8 Final Processing by Relying Party

When the relying party 212 gets a receipt 226 from a reliance manager 218, it first checks that the receipt 226 has been sent to the correct relying party 212 by looking at the identity of the relying party as stated in the receipt 226. Next the relying party 212 associates the receipt 226 with a message 216 which it sent out. To make this association, the relying party 212 checks the value of the unique message identifier (sequence number) in the receipt 226. If the relying party 212 does not find a message 216 corresponding to this receipt 226, or if the receipt has been sent to the wrong relying party, the recipient can either notify the reliance manager of the inconsistency found or simply ignore the receipt and do nothing.

Having determined that it is the correct recipient of the receipt 226 and having found the message 216 corresponding to the receipt, the relying party 212 verifies the signature of the reliance manager and evaluates the receipt to determine the outcome of the reliance manager's processing. In other words, the relying party 212 examines the receipt 226 to determine whether the message 216 passed the requested certificate status checks; whether the amount was within requested reliance limits; and whether the message was archived. If the message was archived, the relying party stores the archive retrieval identification number.

The relying party 212 then detaches and stores the receipt 226 which serves as an advice. Note that the receipt is good only with respect to this specific relying party and may not be relied upon by another party without payment of an additional signature guarantee fee. Where a prior receipt is submitted, the reliance manager may offer a discount to subsequent relying parties for the same document or transaction.

Next, if the receipt 226 indicates that the status checks and reliance limit were acceptable, the relying party 212 evaluates, records, and deducts the fees billed to its account with the billing service 224.

If the status checks fail because the subscriber 202 is over its limits, the relying party determines from the receipt 226 whether the reliance manager 218 supports over-limit exception processing, and then decides whether to request such processing.

Recall that a particular transaction 214 may require that messages be sent to more than one reliance manager 218. The relying party 212 must wait for all reliance managers to respond with receipts 226 before it can make a final determination as to whether to proceed with the transaction 214. Accordingly, the relying party 212 checks to determine whether there are any outstanding reliance manager requests for the transaction associated with this receipt/message pair. If not, the relying party can continue with the transaction 214 with the subscriber 202, otherwise it continues to wait for replies from other reliance managers to other messages 216 associated with the transaction 214.

Based on the outcome reported in all receipts 226 (corresponding to a particular transaction), the relying party 212 can continue with the transaction. That is, having performed all checks and received guarantees and assurances, it may now proceed to actually rely on the transaction.

2.C Form of User Certificate

FIG. 11 shows the elements of a typical signer's certificate for use with the herein disclosed system. The certificate shown is an ITU X.509 certificate, and the additional fields can be extensions as prescribed in X.509 Version 3. Each may be a separate extension, or the complete "reliance specification" can be a single Version 3 extension which contains multiple internal elements, or some combination of the two.

As shown in FIG. 11, the reliance specification may contain at least:

1. A statement that reliance is not recommended or assured above some nominal amount; This amount may increase if loss experience demonstrates that higher values do not pose an undue risk to the CA or its insurers and re-insurers.
2. The name and optionally a network address of at least one status checking service approved by the issuing CA. If an X.500 directory lookup system is used, then the name and address will be one in the same. Otherwise, it may be necessary to specify a valid network address and means of communication.
3. A schedule of basic fees for performing the services described in this embodiment, including the status check message (SCM), reliance guarantee request (RGR), over limit guarantee (OLG), and the "unrely" function (described below) in which the relying party voluntarily agrees to forego some or all of its right to rely on a given signature, thereby freeing a portion of the signer's reliance limit for the current period which can then be used on other transactions.
4. An optional field granting permission for status check service to bill the signature guarantee fees to either the sender/signer or another third party (typically the signer's employer or sponsor) instead of requiring the relying party to pay them. When this feature is used, the status service will keep a record of the signature number (as elsewhere described) or of the signature value (or some value derived therefrom) to prevent the same or different relying party from utilizing the third party billing feature more than once. That is, the status service will detect that a specific digital signature has been checked and insured before, and will reject any attempt to re-check it at the sponsor's expense, which could result in waste of sponsor funds.
5. When authorized, the name and account number of the third party who has agreed to cover the status check and guarantee fees.

Alternatively, the certificate in question may not be an identity certificate which links a subscriber name to a public key, but rather one which confers some privilege or authority on the subscriber, in conjunction with an identity certificate, as described in U.S. application Ser. No. 08/682,071, titled "Method for Securely Using Digital Signatures in a Commercial Cryptographic System," the contents of which are hereby fully incorporated herein by reference. This is not to be confused with the "secondary certificate" of the first embodiment, which is analogous to the signature guarantee receipt of the second embodiment. Such an authorization certificate may also have an associated system of transaction limits which requires administration by a reliance manager, and accordingly will have added to it the same or a similar set of "reliance specification" fields as described above.

2.D Quote Request

The status check message may also contain a quote-request indicator along with a stated reliance amount, which will cause the reliance service to issue a quote for the cost of a full signature guarantee, but without actually issuing the guarantee.

The quote issued by the reliance manager contains a unique identifier which can be used by the relying party in connection with a subsequent signature guarantee request. If the guarantee request is received by the reliance manager soon after the original status check, then the guarantee can be issued without the computational overhead of performing the status check over again. In addition, the quote may specify a time period during which the guarantee can be issued without re-performing the check. In general, the quote will remain valid after this period expires, but the status checks will have to be performed over again, incurring the status check fee again.

2.E The "Unrely" Function

In a reliance management system, the issuing CA will typically assign a fixed reliance limit to each subscriber for a given period of time. For example, a lower level employee with some incidental procurement authority might be given a reliance limit of $1,000 per month. However, there will be numerous instances of transactions which, for one reason or another, do not go through, after they have been status checked by the prospective relying party, who purchased a signature guarantee, thereby depleting the signer's allowed reliance limits for the time period in question.

If the monthly time period is about to expire, the signer could merely wait an additional day, whereupon the system would reset his reliance limit back to $1,000. However, if he has already committed most of his limit and needs to perform additional transactions, this will be insufficient to allow him to continue working without intervention A straightforward solution to this problem is to allow the relying party, normally in his sole discretion, as an accommodation to the signer/subscriber, to send a signed transaction to the reliance manager stating that he no longer intends to rely on the transaction in question, thereby relieving the reliance management system of any further exposure or obligation to pay damages for a possibly inauthentic transaction. The user's reliance limit can be re-credited in full, although the system will retain the status check fee, and possibly some portion of the signature guarantee fee.

As an extension, a relying party may partially rely on a signature in attempting to execute a transaction, but then the transaction is never consummated. For example, a customer might send a "limit order" to a stock broker, who then attempts to execute the order at the price specified by the customer, but due to price fluctuations in the marketplace, the order is never executed, because the price requirements were never met. In this case, the reliance management system has been exposed to the peril or risk that the order might have been placed using an inauthentic signature, so some element of the guarantee fee has been earned (possibly measured by the transaction fees to make and then undo the trade), but the system has not been exposed to the full risk of loss of principal which would have arisen by delivering the securities to an unknown person based on a forged transaction.

The parties to various major transaction systems can agree in advance to a re-credit schedule for failed transactions, or possibly the relying parties (e.g., stock brokers) may elect to absorb the fees and make them up by cross-subsidization from profitable transactions. Such fee chargeback and reliance release schedules may also be elements of the reliance manager service offering, and may appear in the certificates of the reliance service, the subscriber, or the broker.

The "unrely" transaction references a specific previous transaction which the relying party had received from a specific signer, and on which a guarantee has been issued, and will state the old and new (smaller, possibly $0) reliance amounts, signed by the relying party with an attached certificate in the event the relying party does not have an account with the status service. The status service will re-credit the difference to the signer/subscriber's reliance limit for the current period.

2.F Signature Guarantee Time Periods

In a reliance management system for digital signatures as described herein, it is desirable to underwrite (guarantee, insure etc.) the authenticity of digital signatures where the starting and ending times for the guarantee period may be selectable by the parties. The main reason for this is that insurers may thereby be able to reduce the cost of the guarantee fee if their risks have been appropriately reduced by such additional means.

The highest level of risk of reliance on a digital signature generally comes immediately upon receipt, because the signature may have been made by an unauthorized person who improperly gained access to the signing device of the legitimate user, possibly by stealing it, along with knowledge of its activation code or PIN number, but there has been insufficient time for the legitimate user to detect the theft and contact the CA to request that their certificate be revoked. Indeed, this interval of risk is the one for which the reliance management service described herein permits commerce to proceed in a timely manner even in the face of possible forgery losses, by mutualizing those losses in an insurance based system.

a. Delayed Start of Reliance

When a prospective relying party is in a position to "hold" a transaction for several hours, days, or even weeks prior to actually relying on it, the status service may be able to quote a lower signature guarantee fee, because the putative signer will have had much more time to detect and report the theft or unauthorized use of their signing device. This risk reduction effect will be greatest when the intended relying party purchases a guarantee from the reliance service which can then be reported to the signer/subscriber as part of their periodic paper or electronic statement. When the signer sees the unauthorized transaction, they can report it to the status service, which can then notify the relying party before they actually rely on it. A lesser risk reduction effect can be achieved by almost any degree of delay, even as little as one to two hours, since that can give the legitimate user more time to discover that their signing device is missing and report that to their CA and reliance service.

b. Reduced Tail of Reliance

Insurers prefer to assume risks with shorter coverage periods. Some digital signatures may need to be relied upon for long periods of time. For example those protecting deeds, mortgages, wills, laws or treaties may need to remain verifiable and reliable for twenty years or more, while major commercial contracts may need up to ten years of reliance. However, the vast bulk of minor transactions will settle and be forgotten within a few weeks or months, after which an authentic digital signature is not really needed as evidence, because many other facts now exist which would prevent the signer from denying the signature's authenticity. For example if a contract buy or sell goods, services, or financial instruments has been fully performed on both sides, and some number of months has gone by, the relying party may no longer feel a strong need to be protected against a late claim of forgery or fraud. Therefore the relying party can (a) request a shortened guarantee period from the reliance service, or (b) at some point issue an unrely transaction in an attempt to recover part of the reliance guarantee fees paid.

FIG. 12 illustrates the risk, time, and cost considerations discussed in the preceding paragraph. Whenever possible, the sophisticated relying party will seek to insure only its actual exposure, thereby reducing its guarantee fees. In the example shown, the relying party does not need to rely on the transaction (a) until time T1, after which the risk of an unreported forgery has already been significantly reduced, and (b) after time T2, thus eliminating the need for "long tail" insurance coverage far into the future. The premium paid for the signature guarantee may be proportional to the area under the curve between the two vertical lines labeled T1 and T2.

c. Multi-Stage Reliance Pricing

In many business contexts, a document may be relied upon multiple times by different parties for different purposes. An example might be a deal closing in which an inventory of property (a) is transmitted to a lender or investor in anticipation of a possible loan or financing and relied upon by that party in preparing a financial agreement, and (b) is certified and filed as part of a security agreement under the financial agreement as an element of the closing process. Another example might be a vehicle title which is relied upon to obtain (a) purchase or lease financing, (b) liability insurance, and (c) license plates. However, there is always the possibility that the transaction might be delayed or aborted at any step along the way. Therefore in the context of a pre-defined multi-stage transaction, the reliance service may quote a discount price for a series of guarantees of same signature on the same document issued to the same or different parties, and then bill for each according to the stage being completed.

The reliance request message to the status service will then include a transaction class and unique identifier that identifies the initiation and continuation of a particular type of multi-stage transaction (e.g., a home mortgage closing), with a special price being quoted for each transaction stage, or for all stages as a set. If a transaction receipt stated to be for a given stage were actually relied on for a different stage of the transaction, the guarantee would be void.

2.G Portfolio Risk Management

In another embodiment, the CA or other sponsor sends an array of data values describing the permitted activities of the signer/subscriber (and any firm or group to which they may belong) to the reliance server database, and provides that the reliance server may independently manage each of those data values in response to transactions that are sent to it for status checking and signature guarantees (confirmation).

For example, a financial institution may employ various groups of agents to execute different types of financial transactions, and may seek to limit its financial risks by imposing firm-wide policies regarding various types of risks, and then disallowing or requiring special permission for transactions that would violate these policies. Typically the firm's credit and risk management department develops and administers these limits. Some examples include the following:

1. To manage "credit risk," which is the risk that a counterparty will be unable to pay (settle) outstanding transactions, the firm will decree a maximum exposure on uncleared trades with each counterparty, such that the amount of money or securities currently owed to or from that counterparty cannot exceed a specified value, such as $50 million. These limits may be readjusted as new information becomes available that either increases or decreases the creditworthiness of a given counterparty, or class of counterparties.
2. To manage "currency risk," which is the risk of sudden foreign currency price changes, the firm may decree that the total amount of money or securities owed to or from all counterparties that are denominated in a particular foreign currency (such as the Japanese Yen)

cannot exceed some stated value, such as $2 billion. In this manner, if the Yen-Dollar exchange rate makes a large and sudden change, the firm's total maximum risk is known and controlled in advance.

3. To manage "political risk," which is the risk that a given country's government might impose unfavorable economic or legal policies (including at worst the expropriation of foreign owned assets), the firm may decree that the total amount of securities linked to each foreign economy (such as South Africa) cannot exceed some stated value, such as $1 billion. In this manner, if the South African government suddenly seized all foreign assets and refused to pay foreign debts, the firm's total maximum risk is known and controlled in advance.

4. To manage the "regional or industry risk," which is the risk that financial assets (such as stocks or bonds) associated with a particular geographic region (New England, the Rust Belt, Eastern Europe, Silicon Valley, etc.) or type of industry (steel, autos, airlines, chemicals, computers, etc.), the firm may decree that the total amount of securities linked to each given region or industry cannot exceed some stated value, such as $500 million. In this manner, if the price of oil were to quadruple, causing airline stocks to decline in value, the firm's total maximum risk is known and controlled in advance.

As each day's transactions are settled, the firm's outstanding exposure to each type of risk limit is recalculated and reinitialized, so employees can enter into other transactions. Periodically, the outside limits themselves are reviewed and adjusted taking into account the perceived level of volatility and risk in each class of risk, and the firm's capital position and appetite for risk. In addition, exceptions or system over-rides may be made on a manual or semi-automated basis, if a sufficient business case exists for the firm to tolerate the extra risk, possibly only on a short term basis The forgoing risks and others like them can be centrally and automatically administered by a reliance service such as the one described herein, provided that the reliance server is provided with the data content of every transaction to be checked. The transactions are not valid until they are confirmed by the central reliance service operated or contracted by the firm. On a periodic (usually daily) basis, the Firm updates the database of the reliance service with the currently authorized limits, and during the day the transaction flow works against these limits. Of course some transactions which decrease exposure, such as (a) selling Yen for Dollars, or (b) selling General Motors stock for cash will increase the available exposure limits for the Yen (currency) and the automotive industry, respectively. Also the overnight settlement of trades will reduce the amount of money owed to or owed by counterparty firms, thereby releasing some or all of their allowed their credit limits.

Accordingly, the reliance server is modified to store information needed for administering risk exposure limits generated as a result of transactions originated by the employees a given firm. The firm updates this information on a regular basis, and the reliance system decreases or increases available limits according to the transactions being presented to it for reliance checking.

This system can yield a large cost savings and efficiency increase, since it (a) provides a convenient central point for administering all such transactions, not only for one firm but for many, thereby replacing many fragmented systems that are often administered on an after the fact basis, and (b) it can effectively force nearly 100% compliance, since transactions are not valid and will not be paid unless countersigned by the status/reliance checking service.

Such a system can also enforce economic policies at a regional, state, or national level in response to controls imposed by governments or trade organizations, such as to enforce currency exchange controls, or to limit the import or export of a particular commodity. That is, a governmental entity or trade organization might decline to enforce, or place differential taxes upon, transactions depending on their content, direction, monetary value, etc. analogous to the preceding firm-wide system. A receipt from a designated reliance service would be required for all transactions seeking to comply with the control system. The reliance server could then enforce a set of limits designed to conserve scarce foreign exchange reserves, as for example in a developing country.

Thus, a reliance manager for an electronic transaction system is provided. One skilled in the art will appreciate that the present invention can be practiced by other than the described embodiments, which are presented for purposes of illustration and not limitation, and the present invention is limited only by the claims that follow.

What is claimed:

1. A method of managing reliance in an electronic transaction system, the method comprising the steps of:
   (A) a certification authority issuing electronic signals representing a primary certificate to a subscriber;
   (B) forwarding, from the certification authority to a reliance server, electronic signals representing information about the issued primary certificate;
   (C) the reliance server maintaining the forwarded information about issued primary certificate;
   (D) the subscriber forming a transaction and then providing electronic signals representing the transaction to a relying party, the transaction including electronic signals representing the primary certificate;
   (F) the relying party sending to the reliance server electronic signals representing a request for assurance based on the transaction received from the subscriber;
   (F) the reliance server determining whether to provide the requested assurance, said determining based on the information about the issued primary certificate and on the requested assurance; and, based on said determining,
   (G) the reliance server issuing to the relying party electronic signals representing a secondary certificate providing the assurance to the relying party.

2. A method as in claim 1 further comprising the steps of:
   (I) the reliance server and the relying party entering into a contract prior to the reliance server issuing the secondary certificate.

3. A method as in claim 2 wherein the contract is entered into after the relying party makes its request.

4. A method as in claim 1 wherein the primary certificate specifies a reliance limit and wherein the information forwarded by the certification authority to the reliance server includes electronic signals representing assurance parameters controlling whether the reliance server can provide assurance based on the primary certificate.

5. A method as in claim 4 wherein the assurance parameters include electronic signals representing an acceptable reliance limit in excess of the reliance limit specified in the primary certificate, and wherein the request for assurance is a request for reliance on a value in excess of the specified reliance limit, wherein the step (F) of the reliance server determining whether to provide the requested assurance comprises the step of:
   (F1) determining whether the requested reliance would exceed the acceptable reliance limit.

6. A method as in claim 5 further whether comprising the step of:
   (H) the reliance server tracking cumulative liability associated with the primary certificate, and
   wherein the step (F1) of determining comprises the step of:
   (F2) determining whether the requested reliance would cause the cumulative liability to exceed the acceptable reliance limit.

7. A method as in claim 4 wherein the requested assurance is for the accuracy of another certificate, and wherein step (F) further comprises the step of:
   (F1) the reliance server checking the current validity and authenticity of the other certificate; and wherein the step (G) of issuing comprises the step of:
   (G1) the reliance server issuing electronic signals representing the secondary certificate attesting to the accuracy of the other certificate.

8. A method as in claim 7 wherein the step (F1) of checking comprises the steps of:
   verifying the other certificate's digital signature along a chain of certificates, and
   checking whether the requested assurance is within the assurance parameters.

9. A method as in claim 4 wherein the requested assurance is for the authenticity of another certificate, and wherein step (F) further comprises the step of:
   (F1) the reliance server checking authenticity of the other certificate; and wherein the step (G) of issuing comprises the step of:
   (G1) the reliance server issuing electronic signals representing the secondary certificate attesting to the authenticity of the other certificate.

10. A method as in claim 9 wherein the step (F1) of checking comprises the steps of:
    verifying the other certificate's digital signature along a chain of certificates, and
    checking whether the requested assurance is within the assurance parameters.

11. A method as in claim 4 wherein the requested assurance is for the validity of another certificate, and wherein step (F) further comprises the step of:
    (F1) the reliance server checking the current validity of the other certificate; and wherein the step (G) of issuing comprises
    (G1) the reliance server issuing electronic signals representing the secondary certificate attesting to the validity of the other certificate.

12. A method as in claim 11 wherein the step (F1) of checking comprises the steps of:
    determining whether the other certificate has been suspended, revoked, or has expired, and
    checking whether the requested assurance is within the assurance parameters.

13. A method as in claim 4 wherein the requested assurance is for assurance of an agent's authority and wherein step (F) further comprises the step of:
    the reliance server returning electronic signals representing documentation of agency with an enveloping secondary certificate attesting to authenticity.

14. A method as in claim 13 wherein the documentation of agency includes a power of attorney.

15. A method as in claim 4 wherein the requested assurance is for assurance of a person's accreditation and wherein step (F) further comprises the step of:
    the reliance server returning a statement by a licensing or professional body regarding the person's accreditation, with electronic signals representing an enveloping secondary certificate attesting to the statement's authenticity.

16. A method as in claim 4 wherein the requested assurance is for assurance of at least one of existence and good standing of entity and wherein step (F) further comprises the step of:
    the reliance server returning electronic signals representing a statement by a public office in which the entity is incorporated indicating that the entity exists, is in good standing, and is qualified to conduct business, wherein statement is enclosed in the secondary certificate attesting to the statement's authenticity.

17. A method as in claim 4 wherein the requested assurance is for assurance of the performance of an obligation and wherein step (F) further comprises the step of:
    the reliance server issuing electronic signals representing a statement of assurance of payment, wherein statement is enclosed in the secondary certificate attesting to the statement's authenticity.

18. A method as in claim 4 wherein the transaction includes electronic signals representing a digital signature and wherein the assurance parameters include electronic signals representing a maximum supplemental assurance that can be issued for a particular digital signature.

19. A method as in claim 4 wherein the assurance parameters include electronic signals representing at least one of:
    a maximum supplemental assurance that can be issued in a single secondary certificate;
    a maximum supplemental assurance that can be issued to any particular relying party;
    a maximum supplemental assurance that can be issued during one or more specified time intervals;
    a maximum number of secondary certificates that can be issued on the primary certificate;
    a maximum time period during which a secondary certificate may remain valid;
    a maximum reliance limit that can be listed in a secondary certificate valid for a specified transaction type;
    specific information that must be submitted by the relying party along with its request in order to provide a basis for the supplemental assurance;
    an amount of supplemental assurance that the subscriber has prepaid and restrictions on how that prepaid assurance can be issued in a secondary certificate;
    a requirement that the subscriber approve issuance of supplemental assurance by the reliance server for a secondary certificate to be issued to the relying party before a relying party's request for a secondary certificate can be granted;
    thresholds which trigger a report being sent from the reliance server to the certification authority;
    how often the reliance server should report to the certification authority about the extent of supplemental assurance issued on the primary certificate;
    signals representing restrictions limiting disclosure of or access to the primary certificate to specified parties;
    requirements that the transaction be signed by additional parties besides the subscriber, optionally specify who those additional parties are and what number of them must sign;
    a scale of the amount of supplemental assurance that can be issued based on the number and identity of additional parties that sign; and information regarding the validity of the primary certificate.

20. A method as in claim 19 wherein an assurance parameter can be restricted to a particular time period.

21. A method as in claim 20 wherein the particular time period is the entire period during which the primary certificate is valid.

22. A method as in claim 19 wherein the specific information includes electronic signals representing some of a specific class of certificate that has been promised to the relying party, specification of a transaction type and a second signature.

23. An electronic transaction system comprising:

a certification authority issuing electronic signals representing primary certificates to subscribers to the system; and a reliance server connectable to the certification authority and receiving from the certification authority electronic signals representing information regarding the primary certificates issued by the certification authority, the reliance server issuing, upon request from relying parties, electronic signals representing secondary certificates to the relying parties, the issuing being based on the information provided by the certification authority and on information provided by the relying parties.

24. A system as in claim 23 further comprising:

at least one other party connectable to the reliance server, wherein the reliance server provides the electronic signals representing the secondary certificate to the other party prior to issuing the electronic signals representing the secondary certificate to the relying party.

25. A system as in claim 23 wherein the reliance server digitally signs the secondary certificate prior to issuing it to the relying party.

26. In an electronic transaction system in which a certification authority issues electronic signals representing digital certificates to subscribers, a method of automatic replacement of a subscribers certificate, the method comprising the steps of, by a subscriber:

(A) creating a standby application for certification of a new key pair;

(B) digitally signing the standby application with a private key and then destroying the private key;

(C) including electronic signals representing the public key corresponding to the private key in a transactional certificate valid only for the standby application and forwarding the transactional certificate to the certification authority; and, by the certification authority, (D) keeping electronic signals representing the transactional certificate; and subsequently, (E) the subscriber sending electronic signals representing the standby application to the certification authority;

(F) the certification authority verifying the digital signature on the application by reference to the transactional certificate; and then (G) issuing electronic signals representing a new time-based certificate listing the public key indicated in the standby application.

27. A method of managing reliance in an electronic transaction system in which subscribers have digital time-based certificates issued by certification authorities, the method comprising the steps of, by a relying party:

receiving electronic signals representing a transaction from a subscriber, the transaction including information regarding at least one time-based certificate of that subscriber;

creating a message based on certificate information from the transaction, the message specifying an amount of the transaction upon which the relying party intends to rely; and sending electronic signals representing the message to a reliance server requesting a guarantee for the amount of the transaction upon which the relying party intends to rely.

28. A method as in claim 27 further comprising the steps of, the relying party:

receiving electronic signals representing a voucher from the reliance server in response to the step of sending the message; and continuing the transaction with the subscriber based on information in the voucher.

29. A method of managing reliance in an electronic transaction system in which subscribers have digital time-based certificates issued by certification authorities, the method comprising the steps of, by a reliance server:

receiving electronic signals representing a reliance request message from a party, the message specifying an amount of a transaction upon which the party intends to rely and requesting a guarantee for the amount of the transaction, the message including certificate information derived from the transaction;

determining whether to provide a guarantee for the amount of the transaction; and sending electronic signals representing a voucher to the relying party, the voucher including an indication of whether the reliance server guarantees the amount of the transaction.

30. A method as in claim 29 wherein the step of determining further comprises the step of:

determining whether certificates associated with the transaction have been revoked or suspended.

31. A method as in claim 30 further comprising the steps of:

receiving from the certification authority electronic signals representing an actual reliance limit for a certificate;

storing the actual reliance limit; and determining whether the requested amount would exceed the actual reliance limit.

32. A method as in claim 31 further comprising the step of maintaining a cumulative liability for a certification authority.

33. A method of managing reliance in an electronic transaction system, the method comprising the steps of, by a certification authority:

issuing electronic signals representing a time-based certificate to a subscriber, the certificate specifying a stated reliance limit; and forwarding to a reliance server electronic signals representing an actual reliance limit for the certificate, the actual reliance limit being different from the stated reliance limit.

34. A method of managing reliance in an electronic transaction system in which subscribers have digital certificates, the method comprising the steps of, by a relying party:

receiving electronic signals representing a transaction from a subscriber, the transaction including information regarding at least one certificate of that subscriber;

creating electronic signals representing a message based on certificate information from the transaction, the message specifying an aspect of the transaction upon which the relying party intends to rely; and sending the electronic signals representing the message to a reliance server requesting a guarantee for the aspect of the transaction upon which the relying party intends to rely.

35. A method as in claim 34 further comprising the steps of, the relying party:

receiving electronic signals representing a reply receipt from the reliance server in response to the step of sending the message; and continuing the transaction with the subscriber based on information in the reply receipt.

36. A method as in claim 35 wherein the message requested certificate status checks and the reply receipt indicates whether the certificate status checks were acceptable.

37. A method as in claim 35, wherein the receipt indicates whether the reliance server guarantees the aspect of the transaction upon which the relying party intends to rely.

38. A method as in claim 34 wherein some of the subscriber's certificates have associated fees, the method further comprising the step of, the reliance server:

ascertaining a fee for its services based on the fees of certificates associated with the transaction.

39. A method as in claim 38 wherein the fees include usage fees, guarantee fees and lookup fees.

40. A method as in claim 34 wherein the aspect of the transaction upon which the relying party intends to rely specifies a monetary value and the receipt indicates whether the reliance server guarantees the transaction for that monetary value.

41. A method as in claim 40 wherein the reliance server bases its guarantee on information specified in a certificate associated with the transaction.

42. A method of managing reliance in an electronic transaction system in which subscribers have digital certificates, the method comprising the steps of, by a reliance server:

receiving electronic signals representing a message from a party thereby requesting a guarantee for an aspect of the transaction, the message including certificate information derived from the transaction;

validating information in the message to determine whether to provide the guarantee for the aspect of the transaction; and sending electronic signals representing a reply receipt to the relying party, the reply receipt including an indication of whether the reliance server guarantees the aspect of the transaction.

43. A method as in claim 42 wherein the step of validating further comprises the step of:

determining whether certificates associated with the transaction have been revoked or suspended.

44. A method as in claim 43, wherein the certificate information included in the message includes unique identifiers for certificates associated with the transaction, and wherein the step of determining comprises the step of:

looking up unique certificate identifiers on certificate revocation lists.

45. A method as in claim 43, wherein the step of determining is performed based on previously obtained information about certificates.

46. A method as in claim 43 wherein the aspect of the transaction for which a guarantee is requested is a monetary reliance value, and wherein at least one certificate associated with the transaction specifies a monetary limit, the step of validating further comprising the steps of:

determining whether the monetary reliance value is within the monetary limit specified in the certificate.

47. A method as in claim 46, wherein the step of determining further comprising the steps of:

obtaining a value of a current cumulative monetary liability for the certificate;

determining whether the sum of the monetary reliance value and the current cumulative monetary liability would exceed the specified monetary limit; and, based on this determining, updating the current cumulative monetary liability.

48. A method of managing reliance in an electronic transaction system, the method comprising the steps of:

a certification authority issuing electronic signals representing a time-based certificate to a subscriber;

forwarding, from the certification authority, electronic signals representing information about the certificate to a reliance server, the information including a unique identifier for the certificate and an actual reliance limit for the certificate;

the subscriber forming electronic signals representing a transaction based on the certificate and forwarding the transaction to a relying party;

the relying party sending electronic signals representing a reliance request message to the reliance server concerning the transaction;

the reliance server checking information in the reliance request message, and, based on the checking;

issuing electronic signals representing a transactional certificate as a voucher to the relying party.

49. A method as in claim 48 wherein the time-based certificate includes a stated reliance limit which is zero.

50. A method as in claim 48 wherein the reliance request message specifies an amount of the transaction upon which the relying party intends to rely.

51. A method as in claim 50 wherein the step of checking comprises the step of determining whether the specified amount would exceed the certificate's actual reliance limit.

52. A method as in claim 48 wherein the certificate states that reliance on the certificate can only be made if the certificate is checked with a reliance server.

53. A method as in claim 52 wherein the certificate specifies the reliance server.

54. A method as in claim 52 further comprising the step of the reliance server digitally signing the transactional certificate.

55. A method as in claim 52 further comprising the steps of, by the reliance server:

forwarding the electronic signals representing the transactional certificate to at least one other party;

receiving the electronic signals representing the transactional certificate from another party; and digitally signing the transactional certificate.

56. A method as in claim 55 further comprising the step of the other party digitally signing the transactional certificate.

* * * * *